US012795061B2

(12) United States Patent
Ha

(10) Patent No.: US 12,795,061 B2
(45) Date of Patent: Nov. 10, 2026

(54) DISPLAY DEVICE AND TEST SYSTEM COMPRISING THE SAME

(71) Applicant: SAMSUNG DISPLAY CO., LTD., Yongin-si (KR)

(72) Inventor: Young Sang Ha, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 269 days.

(21) Appl. No.: 18/497,153

(22) Filed: Oct. 30, 2023

(65) Prior Publication Data

US 2024/0214546 A1 Jun. 27, 2024

(30) Foreign Application Priority Data

Dec. 26, 2022 (KR) ........................ 10-2022-0184117

(51) Int. Cl.

| | |
|---|---|
| ***H04N 13/327*** | (2018.01) |
| ***H04N 13/00*** | (2018.01) |
| ***H04N 13/125*** | (2018.01) |
| ***H04N 13/305*** | (2018.01) |
| ***H04N 13/398*** | (2018.01) |

(52) U.S. Cl.

CPC ......... *H04N 13/327* (2018.05); *H04N 13/125* (2018.05); *H04N 13/305* (2018.05); *H04N 13/398* (2018.05); *H04N 2013/0074* (2013.01)

(58) Field of Classification Search

CPC .. H04N 13/125; H04N 13/305; H04N 13/327; H04N 13/398; H04N 2013/007; H04N 13/354

USPC ...................................................... 348/54, 51

See application file for complete search history.

(56) References Cited

U.S. PATENT DOCUMENTS

| | | | | |
|---|---|---|---|---|
| 11,095,872 | B2 * | 8/2021 | Park | G09G 3/003 |
| 2014/0192169 | A1 * | 7/2014 | Kashiwagi | H04N 13/398 348/51 |
| 2016/0150223 | A1 * | 5/2016 | Hwang | H04N 13/324 348/51 |
| 2021/0274153 | A1 * | 9/2021 | Cho | H04N 13/305 |
| 2021/0385431 | A1 * | 12/2021 | Ohyama | G02B 30/29 |
| 2022/0191455 | A1 * | 6/2022 | Suzuki | H04N 13/125 |

FOREIGN PATENT DOCUMENTS

| | | |
|---|---|---|
| KR | 10-2006-0054973 | 5/2006 |
| KR | 10-1289656 | 7/2013 |
| KR | 10-1350641 | 1/2014 |
| KR | 10-2015-0074452 | 7/2015 |

(Continued)

OTHER PUBLICATIONS

Office Action dated Aug. 4, 2026 in related Korean Patent Application Serial No. 10-2022-0184117, in Korean, 5 pages.

*Primary Examiner* — Christopher S Kelley
*Assistant Examiner* — Ana Picon-Feliciano
(74) *Attorney, Agent, or Firm* — F. CHAU & ASSOCIATES, LLC

(57) ABSTRACT

A display device includes a display panel having a plurality of sub-pixels, an optical member on the display panel, and a display driver configured to drive the display panel to display a test image on the display panel, and upon receiving a correction coefficient for each of a plurality of viewpoints of the display panel based on the display of the test image, to correct image data using the correction coefficient for each of the plurality of viewpoints.

20 Claims, 20 Drawing Sheets

(56) References Cited

FOREIGN PATENT DOCUMENTS

| | | | |
|---|---|---|---|
| KR | 10-2018-0075293 | A | 7/2018 |
| KR | 10-1925459 | | 12/2018 |
| KR | 10-2021-0032771 | | 3/2021 |

* cited by examiner

DISPLAY DEVICE AND TEST SYSTEM COMPRISING THE SAME

This application claims priority under 35 U.S.C. § 119 to Korean Patent Application No. 10-2022-0184117, filed on Dec. 26, 2022, in the Korean Intellectual Property Office, the disclosure of which is herein incorporated by reference in its entirety.

BACKGROUND

1. Technical Field

Embodiments of the present disclosure relate to a display device and a test apparatus including the same.

2. Discussion of Related Art

Typically, a three-dimensional (3D) image display device separately displays a left-eye image and a right-eye image. When viewed together, the left-eye image and the right eye-image may be combined by a viewer's brain into a single 3D view, giving the viewer the perception of 3D depth. to That is, the left-eye image and the right eye-image may be slightly different images generated using the concept of binocular parallax, that when viewed together may create the perception of a 3D experience for the viewer.

The 3D image display devices may be divided into those that employ stereoscopic technology and those that use an auto-stereoscopic technology. The stereoscopic technology typically utilizes parallax images between left and right eyes, which provide large stereoscopic effects. The stereoscopic technology may be implemented with, or without, glasses (glasses-free 3D).

For the stereoscopic type 3D image display devices designed to be used with glasses, a left-eye image and a right-eye image having different polarizations are displayed, so that the viewer with polarized glasses or shutter glasses can perceive a 3D image. For glasses-free stereoscopic type 3D image display devices, an optical member such as a parallax barrier and a lenticular sheet is formed in the display device, and an optical axis of a left-eye image is separated from an optical axis of a right-eye image, so that a viewer can perceive a 3D image. The glasses-free stereoscopic display device has a problem of overlap between images across adjacent viewpoints.

SUMMARY

Aspects of the present disclosure provide a display device that can detect and analyze an amount of crosstalk that results in a mixed image at each viewpoint, which may be due to imperfect separation of images for different viewpoints or the leakage of an image for one view into another, and a test system including the same.

Aspects of the present disclosure also provide a display device that can correct image data at each viewpoint based on a magnitude of crosstalk for each viewpoint of a display device, and a test system including the same.

It should be noted that aspects of the present disclosure are not limited to the above-mentioned aspects; and other aspects of the present disclosure will be apparent to those skilled in the art from the following descriptions.

According to an embodiment of the disclosure, a display device comprising a display panel comprising a plurality of sub-pixels, an optical member on the display panel, and a display driver configured to drive the display panel to display a test image on the display panel, and upon receiving a correction coefficient for each of a plurality of viewpoints of the display panel based on the display of the test image, to correct image data using the correction coefficient for each of the plurality of viewpoints.

In an embodiment, the optical member comprises a plurality of stereoscopic lenses, and the display driver designates a viewpoint of the plurality of viewpoints and a viewpoint number to each of the sub-pixels based on relative positions of the sub-pixels for each of the plurality of stereoscopic lenses of the optical member, aligns positions of the image data according to the viewpoint and the viewpoint number of each of the sub-pixels, corrects the image data using the correction coefficient for each of the plurality of viewpoints, and displays an image in a display area of the display panel using the image data corrected using the correction coefficient for each of the plurality of viewpoints.

In an embodiment, the display driver generates corrected image data for each of the plurality of viewpoints by adding/subtracting the correction coefficient to/from the image data for each of the plurality of viewpoints, generates data voltages corresponding to the corrected image data, and provides the data voltages to the display panel. In an embodiment, the display driver generates corrected image data for each of the plurality of viewpoints by multiplying the correction coefficient for each of the plurality of viewpoints by the image data for each of the plurality of viewpoints, generates data voltages corresponding to the corrected image data, and provides the data voltages to the display panel.

According to an embodiment of the disclosure, a test apparatus for testing a display device comprises a plurality of optical property detectors arranged at a predetermined spacing on an inner reflection surface of a curved reflective panel facing a display panel of the display device and detecting optical property values of a test image displayed by the display panel, a distance information detector detecting distance information between the display panel and the curved reflective panel and a radius of curvature of the curved reflective panel, a reflection curvature converter modulating the radius of curvature of the curved reflective panel, a reflection curvature controller controlling the reflection curvature converter according to at least one of an optical property value of the test image or the radius of curvature of the curved reflective panel, an image detector acquiring test image data by capturing the test image reflected off the curved reflective panel, and a stereoscopic image analyzer analyzing an amount of crosstalk for a plurality of viewpoints of the display device by analyzing at least one of a grayscale value or luminance value of the test image data.

In an embodiment, the plurality of optical property detectors are arranged in a fan shape at a predetermined spacing on the inner reflection surface of the curved reflective panel maintaining the radius of curvature, such that the plurality of optical property detectors detect illuminance values of the test image displayed by the display panel.

In an embodiment, the distance information detector measures a distance between the display panel and the inner reflection surface of the curved reflective panel, distances between the display panel and side portions of the curved reflective panel, and distances at angles of fan shapes using at least one of a plurality of ultrasonic sensors or a plurality of infrared sensors. In an embodiment, the distance information detector detects curvature information and curvature radius information of the curved reflective panel by measuring a distance between the display panel and the inner reflection surface of the curved reflective panel according to at least one of a predetermined rotation radius or rotation angle.

In an embodiment, the reflection curvature controller generates control signals to control the reflection curvature converter to adjust the radius of curvature of the curved reflective panel until illuminance values detected by the plurality of optical property detectors are equal.

In an embodiment, the stereoscopic image analyzer compares a luminance value of each viewpoint among the plurality of viewpoints to an average luminance value of the plurality of viewpoints using a leave-one-out method to extract a correction coefficient for each viewpoint of the plurality of viewpoints, wherein the correction coefficient reduces a difference value between the luminance value for each viewpoint of the plurality of viewpoints and the average luminance value of the plurality of viewpoints using the leave-one-out method.

According to an embodiment of the disclosure, a test system comprising a stereoscopic display device that displays a test image, the stereoscopic display device comprising a display panel and an optical member on the display panel, and a test apparatus that detects a reflection of the test image reflected off a curved reflective panel, generates a correction coefficient for a plurality of viewpoints according to an optical property of the reflection of the test image for each of the viewpoints of the plurality of viewpoints, and provides the correction coefficient to the stereoscopic display device, wherein the test apparatus modulates a curvature of the curved reflective panel according to at least one of the optical property of the reflection of the test image or a distance between the display panel and the curved reflective panel, and analyzes the optical property of the reflection of the test image with a modulated curvature to generate the correction coefficient for each of the viewpoints of the plurality of viewpoints based on a result of the analysis.

In an embodiment, the test apparatus comprises a plurality of optical property detectors arranged at a predetermined spacing on an inner reflection surface of the curved reflective panel facing the display panel and detecting optical property values of the reflection of the test image, a distance information detector detecting distance information between the display panel and the curved reflective panel and a radius of curvature of the curved reflective panel, a reflection curvature converter modulating the radius of curvature of the curved reflective panel, a reflection curvature controller controlling the reflection curvature converter according to at least one of the optical property of the reflection of the test image or the radius of curvature of the curved reflective panel, an image detector acquiring test image data by capturing the reflection of the test image, and a stereoscopic image analyzer analyzing an amount of crosstalk for each of the viewpoints of the plurality of viewpoints by analyzing at least one of a grayscale value or luminance value of the test image data.

In an embodiment, the plurality of optical property detectors are arranged in a fan shape at a predetermined spacing on an inner reflection surface of the curved reflective panel maintaining the radius of curvature, such that the plurality of optical property detectors detect an illuminance value of the reflection of the test image.

In an embodiment, the distance information detector measures a distance between the display panel and the inner reflection surface of the curved reflective panel, distances between the display panel and side portions of the curved reflective panel, and distances at angles of fan shapes using at least one of a plurality of ultrasonic sensors or a plurality of infrared sensors. In an embodiment, the distance information detector detects curvature information and curvature radius information of the curved reflective panel by measuring a distance between the display panel and the inner reflection surface of the curved reflective panel according to at least one of a predetermined rotation radius or rotation angle.

In an embodiment, the reflection curvature controller generates control signals to control the reflection curvature converter to adjust the radius of curvature of the curved reflective panel to equalize illuminance values detected by the plurality of optical property detectors.

In an embodiment, the reflection curvature converter comprises a first pressing rod and a second pressing rod that support and press side portions of the curved reflective panel, a first moving member and a second moving member that supports and move the first pressing rod and the second pressing rod, respectively, at least one moving rail that defines a moving path of the first moving members and the second moving member, and a first driving motor and a second driving motor that move the first moving member and the second moving member along the at least one moving rail in response to control signals generated by the reflection curvature controller.

In an embodiment, the reflection curvature controller generates control signals to control the reflection curvature converter to adjust the curvature radius of the curved reflective panel.

In an embodiment, the stereoscopic image analyzer compares a luminance value of each of the viewpoints relative to an average luminance value for the plurality of viewpoints using a leave-one-out method to extract the correction coefficient for each of the viewpoints of the plurality of viewpoints to reduce a difference value between the luminance value for each of the viewpoints of the plurality of viewpoints and the average luminance value of the plurality of the viewpoints using the leave-one-out method.

In an embodiment, the correction coefficient for each of the viewpoints of the plurality of viewpoints is set in inverse proportion to a respective one of the difference values.

According to embodiments of the present disclosure, it may be possible to detect and analyze the magnitude of crosstalk by way of acquiring and analyzing a test image using a curved reflective panel, without being distorted by a detection distance.

In addition, according to embodiments of the present disclosure, it may be possible to increase the display quality of stereoscopic images by way of analyzing crosstalk in a display device and correcting image data to display images.

It should be noted that effects of some embodiments are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION

The present disclosure will now be described more fully hereinafter with reference to the accompanying drawings, in which preferred embodiments of the disclosure are shown. This disclosure may, however, be embodied in different forms and should not be construed as limited to embodiments set forth herein. Rather, embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element could be termed a second element without departing from the teachings of the present disclosure. Similarly, the second element could also be termed the first element.

Features of various embodiments of the present disclosure may be combined with each other, in part or in whole. Various combinations of the features are possible. Different embodiments may be implemented independently of each other or may be implemented together in an association.

Hereinafter, embodiments of the present disclosure will be described with reference to the accompanying drawings.

Figure 1:
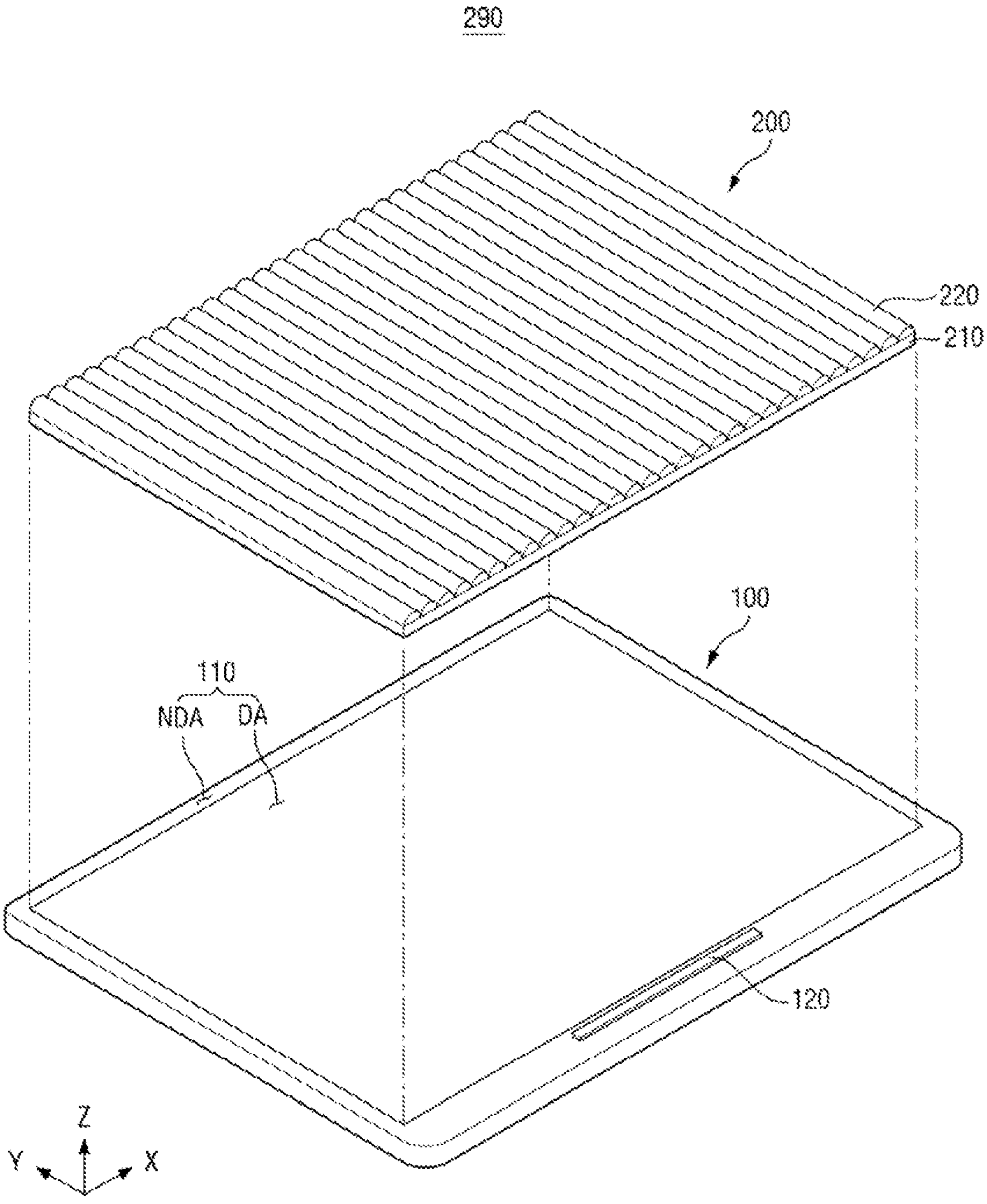
FIG. 1 is an exploded, perspective view showing a display device including a display module and an optical member according to an embodiment of the present disclosure.
Figure 2:
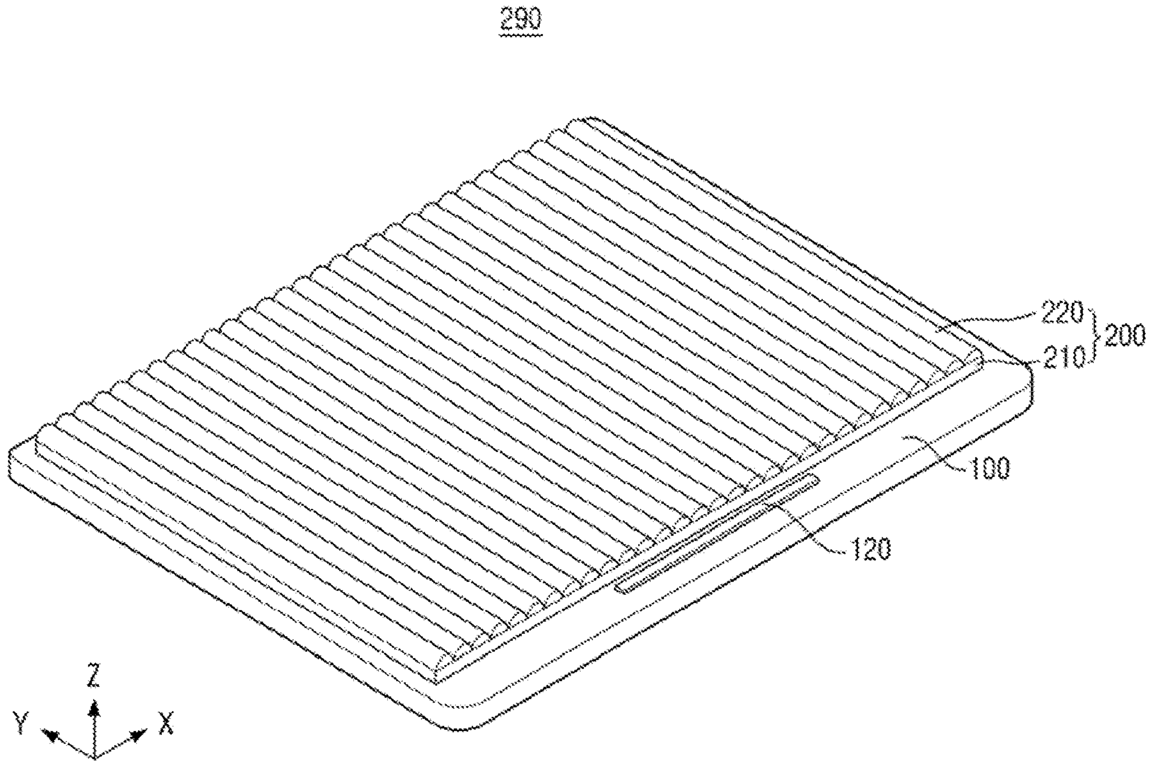
FIG. 2 is a view showing the display panel and the optical member shown in FIG. 1.

FIG. 1 is an exploded, perspective view showing a display device including a display module and an optical member according to an embodiment of the present disclosure. FIG. 2 is a view showing the display panel and the optical member shown in FIG. 1.

Referring to FIG. 1 and FIG. 2, a display device 290 may be implemented as a flat panel display device such as a liquid-crystal display (LCD) device, a field emission display (FED) device, a plasma display panel (PDP) device, or an organic light-emitting display (OLED) device. The display device 290 may be a stereoscopic display device.

The display device 290 may be a 3D image display device including a display module 100 and an optical member 200. The 3D image display device may display images on a front side. The 3D image display device may separately display a left-eye image and a right-eye image. The left-eye image and the right-eye image may be generated using the concept of binocular parallax, such that when the left-eye image and the right-eye image are viewed together they may create a perception of a 3D experience.

The 3D image display device may be a light-field display device that allows different image information to be seen by a viewer's left eye and right eye by disposing the optical member 200 on the front side of the display module 100. The light-field display device may generate a 3D image by generating a light field with the display module 100 and the optical member 200. As will be described later, light rays generated in each of the pixels of the display module 100 of the light-field display device may form a light field directed in a particular direction by stereoscopic lenses, pinholes or barriers. The direction of the light rays may correspond to a particular viewing angle and/or a particular viewpoint. In this manner, 3D image information associated with the direction can be provided to the viewer.

The display module 100 may include a display panel 110, a display driver 120, and a circuit board (not shown).

The display panel 110 may include a display area DA and a non-display area NDA. The display area DA may include data lines, scan lines, supply voltage lines, and a plurality of pixels connected to the data lines and scan lines. For example, the scan lines may be extended in a first direction (an x-axis direction) and be spaced apart from one another in a second direction (a y-axis direction). The data lines and the supply voltage lines may be extended in the second direction (the y-axis direction) and be spaced from one another in the first direction (the x-axis direction).

Each of the pixels may be connected to at least one scan line, a data line, and a supply voltage line. Each of the pixels may include thin-film transistors including a driving transistor and at least one switching transistor, a light-emitting element, and a capacitor. When a scan signal is applied from a scan line, each of the pixels receives a data voltage from a data line and supplies a driving current to the light-emitting element according to the data voltage applied to a gate electrode of the driving transistor, so that light can be emitted.

The non-display area NDA may be disposed at the edge of the display panel 110 to surround the display area DA. The non-display area NDA may include a scan driver (not shown) that may apply scan signals to scan lines, and pads (not shown) connected to the display driver 120. For example, the display driver 120 may be disposed on a side of the non-display area NDA, and the pads may be disposed on an edge of the non-display area NDA on which the display driver 120 is disposed.

The display driver 120 may output signals and voltages for driving the display panel 110. The display driver 120 may supply data voltages to data lines. The display driver 120 may supply a supply voltage to the supply voltage line, and may supply scan control signals to the scan driver. For example, the display driver 120 may be implemented as an integrated circuit (IC) and may be disposed in the non-display area NDA of the display panel 110 by a chip on glass (COG) technique, a chip on plastic (COP) technique, or an ultrasonic bonding. In another example, the display driver 120 may be mounted on a circuit board (not shown) and connected to the pads of the display panel 110.

The display driver 120 may receive and store a predetermined correction coefficient for each viewpoint from a test apparatus. The predetermined correction coefficient may be used to reduce crosstalk. Specifically, the display driver 120 may designate the viewpoint and a viewpoint number to each of the sub-pixels based on the relative positions of the sub-pixels for each of a plurality of stereoscopic lenses 220. In addition, the display driver 120 may align positions of image data input from an external source for each horizontal line based on the viewpoint and the viewpoint number of each of the sub-pixels. Subsequently, the display driver 120 may correct the image data for each viewpoint using the correction coefficient for each viewpoint set received from the test apparatus and generate corrected image data. The display driver 120 may generate data voltages corresponding to the corrected image data and supply the data voltages to the data lines, so that images can be displayed based on the relative positions of the sub-pixels with respect to the stereoscopic lenses 220.

The optical member 200 may be disposed on the front side of the display module 100. The optical member 200 may be attached to a surface of the display module 100 by an adhesive member. The optical member 200 may be attached to the front surface of the display module 100 by a panel bonding apparatus.

The optical member 200 may be implemented as a lenticular lens sheet including the stereoscopic lenses 220. The stereoscopic lenses 220 may be implemented as liquid-crystal lenses that work as lenses by controlling liquid crystals in liquid-crystal layers. When the stereoscopic lenses 220 are implemented as the lenticular lens sheet, the stereoscopic lenses 220 may be disposed on a flat portion 210 of the optical member 200.

The flat portion 210 of the optical member 200 may be disposed directly on the front side of the display module 100. For example, a first surface of the flat portion 210 facing the display module 100 and an opposite surface of the flat portion 210 opposed to the first surface of the flat portion 210 may be parallel to each other. The flat portion 210 may output the light incident from the display module 100. The flat portion 210 may output the light incident from the display module 100 without modification in direction. A direction of light passing through the first surface of the flat portion 210 may be coincident with a direction of light passing through the opposite surface of the flat portion 210. The flat portion 210 may be formed integrally with the stereoscopic lenses 220, but the present disclosure is not limited thereto.

The stereoscopic lenses 220 may be disposed on the flat portion 210 of the optical member 200, and may change the direction in which light incident from the display module 100 on a rear side exit or travel toward the front side. Specifically, the image display light incident from the rear side of the display module 100 may pass through the flat portion 210 to reach a rear side of the stereoscopic lenses 220.

The stereoscopic lenses 220 may be inclined at a predetermined angle from a side of the display module 100. For example, the stereoscopic lenses 220 may be slanted lenses inclined by a predetermined angle from the side of each of the plurality of pixels of the display panel 110 or half-cylindrical lenses. The predetermined angle may prevent the certain lines of the display device from being perceived by a viewer. For another example, the stereoscopic lenses 220 may be implemented as Fresnel Lenses. The shape or type of the stereoscopic lenses 220 is not necessarily limited thereto.

The stereoscopic lenses 220 may be fabricated separately from the flat portion 210 and may be attached to the flat portion 210 of the optical member 200. Alternatively, the stereoscopic lenses 220 may be formed integrally with the flat portion 210. For example, the stereoscopic lenses 220 may be embossed into an upper surface of the flat portion 210.

Figure 3:
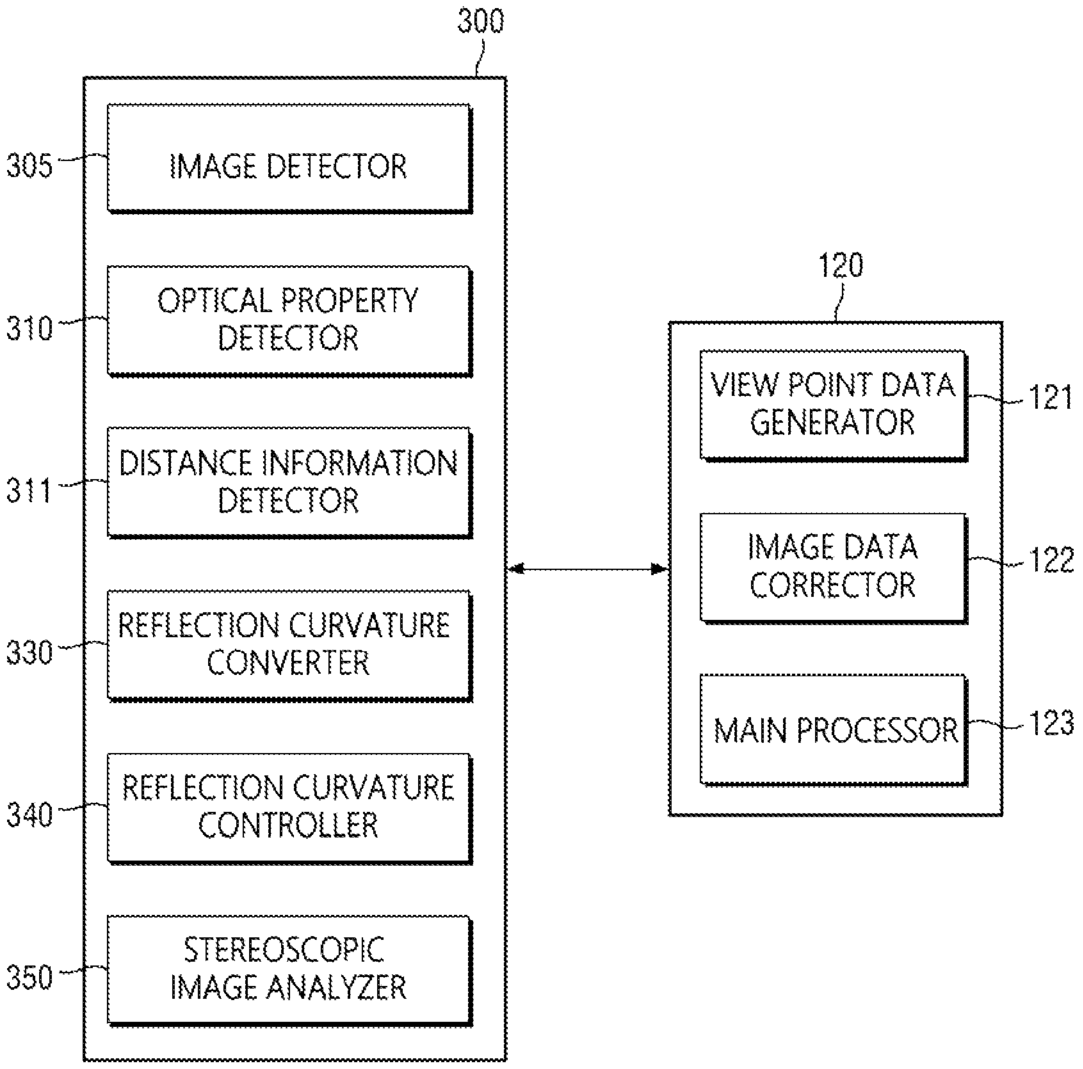
FIG. 3 is a block diagram illustrating a test system including a display device and a test apparatus according to an embodiment.

FIG. 3 is a block diagram illustrating a test system including a display device and a test apparatus according to an embodiment.

Referring to FIG. 3, a test apparatus 300 includes an image detector 305, an optical property detector 310, a distance information detector 311, a reflection curvature converter 330, a reflection curvature controller 340, and a stereoscopic image analyzer 350.

In the test apparatus 300, the display device 290 may display a test image by driving sub-pixels to which viewpoint numbers for different viewpoints are designated. The viewpoints of the display device 290 may be set according to the relative positions of the sub-pixels with respect to each of the stereoscopic lenses 220.

Specifically, the viewpoints of the display device 290 may be in line with, or lie within, a width of each stereoscopic lens 220 in a thickness direction, and thus the number of the viewpoints may be equal to a number of the sub-pixels disposed on the rear side of each of the stereoscopic lenses 220. For example, if the number of the sub-pixels disposed on the rear surface of each of the stereoscopic lenses 220 in line with, or lie within, the width of its rear surface (or base surface or base side) is 24, there may be 24 viewpoints for detecting optical properties of the display device 290. Alternatively, if the number of the sub-pixels disposed on the rear surface of each of the stereoscopic lenses 220 in line with, or lie within, the width of its rear surface is 12, there may be 12 viewpoints for detecting optical properties of the display device 290.

The display device 290 displays a test image by driving sub-pixels having viewpoints designated thereto sequentially or simultaneously for different viewpoints. For example, when the number of viewpoints of the display device 290 is set to 24, test images of the 24 viewpoints may be displayed by driving the sub-pixels divided into the 24 viewpoints simultaneously or sequentially.

The optical property detector 310 may include a plurality of optical property detectors disposed at a predetermined spacing on an inner reflection surface of the curved reflective panel 320 facing the display device 290. The optical property detectors of the optical property detector 310 may detect optical property values of the test images displayed on the display device 290. Each of the optical property detectors of the optical property detector 310 may detect an illuminance value of a test image displayed on the display device 290. The optical property detectors of the optical property detector 310 may be arranged in a fan shape at a predetermined spacing on the inner reflection surface of the curved reflective panel maintaining a predetermined radius of curvature. The optical property detectors of the optical property detector 310 may be arranged side-by-side at the predetermined spacing on an upper part of the inner reflection surface, a lower part of the inner reflection surface, or the center of the inner reflection surface of the curved reflective panel.

The distance information detector 311 may be disposed on a same line as the display device 290. The distance information detector 311 may measure distance information between the display device 290 and the curved reflective panel, and a radius of curvature of the curved reflective panel. The distance information detector 311 may be disposed parallel to the display device 290 in a vertical direction or horizontal direction on the upper side, the lower side or at least one side of the display device 290. The distance information detector 311 may measure distance information between the display device 290 and the curved reflective panel using a plurality of ultrasonic sensors or a plurality of infrared sensors, for example. The distance information detector 311 may measure a distance between the display device 290 and a center of the inner reflection surface of the curved reflective panel, a distance between the display device 290 and sides of the inner reflection surface of the curved reflective panel, and distances at angles of fan shapes depending on a number of the plurality of ultrasonic sensors or the plurality of infrared sensors. In addition, the distance information detector 311 may measure a distance between the display device 290 and the inner reflection surface of the curved reflective panel according to a predetermined rotation radius or rotation angle, thereby detecting curvature information and curvature radius information of the curved reflective panel 320.

The reflection curvature controller 340 may generate a control signal for adjusting radius of curvature of the curved reflective panel based on the optical property values detected through the optical property detectors of the optical property detector 310, the distance between the display device 290 and the inner reflection surface of the curved reflective panel, or information on the radius of curvature of the curved reflective panel. The reflection curvature controller 340 may supply control signals for adjusting the radius of curvature to the reflection curvature converter 330 to control a magnitude or degree of modulation of the radius of curvature of the reflection curvature converter 330.

Specifically, the reflection curvature controller 340 may generate control signals for gradually adjusting the radius of curvature of the curved reflective panel so that the optical property values (e.g., illuminance values) detected by the plurality of optical property detectors 310 may be made equal.

In addition, the reflection curvature controller 340 may generate control signals for gradually adjusting the radius of curvature of the curved reflective panel until the curvature or the radius of curvature of the curved reflective panel have been equalized according to the distance between the display device 290 and the inner reflection surface of the curved reflective panel. In addition, the reflection curvature controller 340 may provide the control signals for gradually adjusting the radius of curvature of the curved reflective panel to the reflection curvature converter 330, so that the reflection curvature converter 330 gradually modulates and adjusts the radius of curvature of the curved reflective panel.

The reflection curvature converter 330 may gradually press at least one of a rear surface or side portions of the curved reflective panel in response to a control signal from the reflection curvature controller 340. The reflection curvature converter 330 may modulate and adjust the radius of curvature of the curved reflective panel. The reflection curvature converter 330 may fix the rear center of the curved reflective panel and gradually press the sides portions or the rear surface on the side portions of the curved reflective panel toward the front side in response to a control signal, to modulate and adjust the curvature of the curved reflective panel. The radius of curvature of the curved reflective panel may be adjusted depending on a change in pressure and a change in the angle of pressing the sides or the rear surface on the sides portions of the curved reflective panel toward the front side.

The image detector 305 may be disposed on the same line as the display device 290. The image detector 305 may capture a test image of the display device 290 reflected off a modulated curvature of the inner reflection surface of the curved reflective panel, and acquire test image data. The image detector 305 may include at least an image sensor or a camera. The image detector 305 may be disposed parallel to the display device 290 in a vertical or horizontal direction on the upper side, the lower side or at least one side of the display device 290. The image detector 305 may be formed integrally with the distance information detector 311 and the stereoscopic image analyzer 350 as a single unit or a module.

The stereoscopic image analyzer 350 may analyze a grayscale value or the luminance value for each pixel from the test image data acquired by the image detector 305. The stereoscopic image analyzer 350 may analyze the amount of crosstalk for each viewpoint. Specifically, the stereoscopic image analyzer 350 may sort the test image data acquired by the image detector 305 by pixel data, and detect the grayscale value (e.g., red, green and blue grayscale values) and luminance values for each pixel data. The stereoscopic image analyzer 350 may derive a crosstalk analysis result value for each viewpoint using the luminance value for each pixel data and a predetermined crosstalk analysis algorithm or mathematic formula.

The stereoscopic image analyzer 350 may compare and analyze the crosstalk analysis result values for each viewpoint to calculate a correction coefficient for each viewpoint of the display device 290. For example, the stereoscopic image analyzer 350 may use a leave-one-out method. In the leave-one-out method, the stereoscopic image analyzer 350 may determine an average luminance value for all of the viewpoints, except a viewpoint of interest. The stereoscopic image analyzer 350 may compare the luminance value for the viewpoint of interest with the average luminance value of all of the other viewpoints. The stereoscopic image analyzer 350 may extract or calculate a correction coefficient for each viewpoint to reduce or minimize a difference value between the luminance value for each viewpoint and the average luminance value of the other viewpoints. In this instance, the correction coefficient for each viewpoint may be set in an inverse proportion to a difference value between the optical property value for each viewpoint and the average of the optical property value of the other viewpoints. The correction coefficient for each viewpoint may be set in advance based on a number of experimental results and calculation results, which may be stored in, and retrieved from, a database.

Referring to FIG. 3, the display driver 120 of the display device 290 may include a viewpoint data generator 121, an image data corrector 122, and a main processor 123.

The viewpoint data generator 121 of the display driver 120 may align image data input from an external source according to the positions of the sub-pixels in the vertical direction and the horizontal direction, and designate a viewpoint number to each of the aligned sub-pixels based on the width information and the size information.

The image data corrector 122 may correct the image data for each viewpoint by calculating corrected image data for each viewpoint using the correction coefficients received from the stereoscopic image analyzer 350 of the test apparatus 300. In doing so, the display driver 120 may generate corrected image data for each viewpoint by adding/subtracting the correction coefficient for each viewpoint to/from the image data for each viewpoint. In another example, the display driver 120 may generate corrected image data for each viewpoint by multiplying the image data for each viewpoint by the correction coefficient.

The main processor 123 may generate data voltages corresponding to grayscale values or luminance values of the corrected image data for different viewpoints. In addition, by supplying data voltages to the data lines of the display panel 110, images may be displayed depending on the relative positions of the sub-pixels with respect to the stereoscopic lenses 220.

Figure 4:
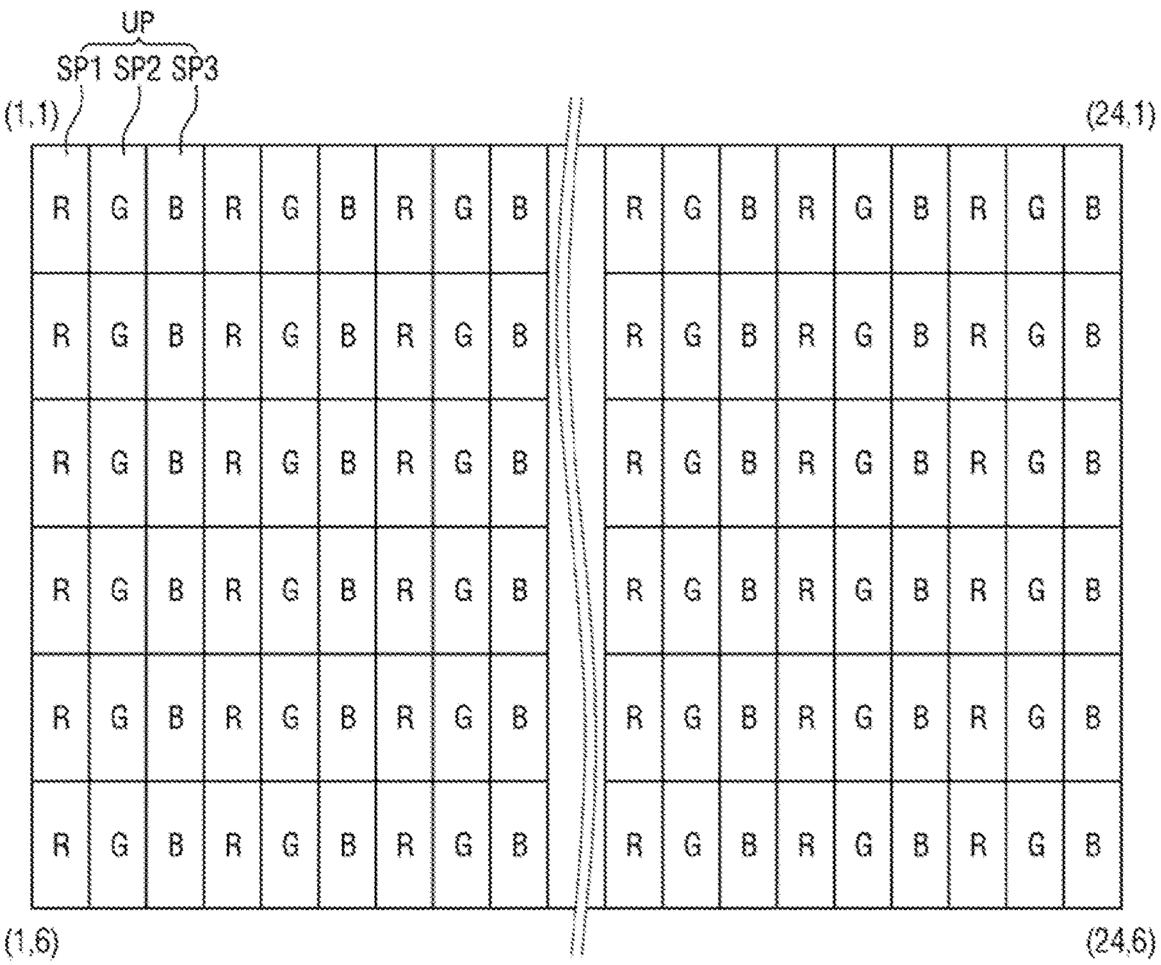
FIG. 4 is a plan view showing an arrangement of sub-pixels of a display area according to an embodiment.

FIG. 4 is a plan view showing an arrangement of the sub-pixels of the display area according to an embodiment.

FIG. 4 shows the arrangement of the sub-pixels in six rows and twenty-four columns. Accordingly, the arrangement includes the sub-pixel located at the first row and the first column through the sub-pixel located at the sixth row and the twenty-fourth column.

Referring to FIG. 4, a plurality of unit pixels is disposed and formed in the display area DA of the display panel 110, and each of the unit pixels includes a plurality of sub-pixels. For example, a first unit pixel UP may be disposed in the display area DA and may include a first sub-pixel SP1, a second sub-pixel SP2, and a third sub-pixel SP3. The sub-pixels may be arranged along a plurality of rows and a plurality of columns. For example, the sub-pixels may be arranged and formed in a vertical or horizontal stripe structure. The display area DA of the display panel 110 may include more unit pixels as the resolution of the display device increases.

Each of the unit pixels may include first to third sub-pixels displaying different colors. For example, the first unit pixel UP may include the first sub-pixel SP1, the second sub-pixel SP2, and the third sub-pixel SP3, which may display different colors. The plurality of sub-pixels may be connected to n data lines and m scan lines where the n data lines and the m scan lines intersect each other. It should be understood that n and m are natural numbers, and that n and m may be the same number or different numbers. Each of the plurality of sub-pixels may include a light-emitting element and a pixel circuit. The pixel circuit may include a driving transistor, at least one switching transistor and at least one capacitor to drive the light-emitting element of a corresponding one of the plurality of sub-pixels.

Each of the plurality of unit pixels may include one first sub-pixel, one second sub-pixel, and one third sub-pixel. Alternatively, each of the plurality of unit pixels may include four sub-pixels, i.e., one first sub-pixel, two second sub-pixels, and one third sub-pixel. The number of sub-pixels included in each unit pixel is not necessarily limited thereto. For example, in the first unit pixel UP, the first sub-pixel SP1 may be a red sub-pixel, the second sub-pixel SP2 may be a green sub-pixel, and the third sub-pixel SP3 may be a blue sub-pixel. Each of the first sub-pixel SP1, the second sub-pixel SP2, and the third sub-pixel SP3 may receive a data signal containing luminance information of red, green or blue light from the display driver 120 and may output light of the respective color.

Figure 5:
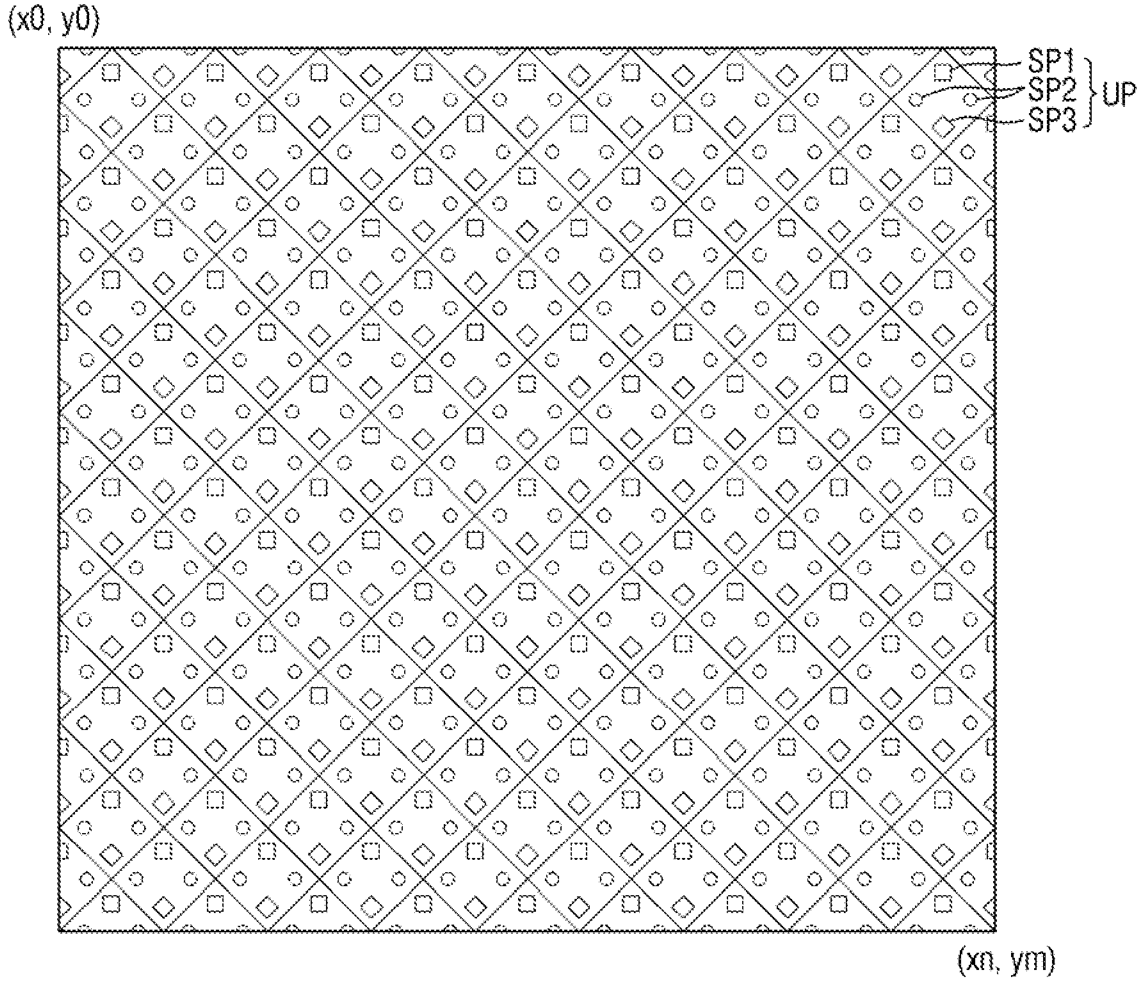
FIG. 5 is a plan view showing an arrangement of sub-pixels of a display area according to another embodiment.

FIG. 5 is a plan view showing an arrangement of sub-pixels of a display area according to another embodiment.

Referring to FIG. 5, a plurality of unit pixels and a plurality of sub-pixels may be arranged in the PENTILE® matrix. Specifically, each of the plurality of unit pixels may include first to third sub-pixels arranged in the PENTILE® matrix. For example, a second unit pixel UP may include a first sub-pixel SP1, two second sub-pixels SP2, and a third sub-pixel SP3 arranged in the PENTILE® matrix. The plurality of sub-pixels may be connected to n data lines and m scan lines where the n data lines and the m scan lines intersect each other. It should be understood that n and m are natural numbers, and that n and m may be the same number or different numbers.

Each of the plurality of unit pixels may include, but is not limited to, one first sub-pixel, two second sub-pixels, and one third sub-pixel. For example, in the second unit pixel UP, the first sub-pixel SP1 may be a red sub-pixel, the second sub-pixel SP2 may be a green sub-pixel, and the third sub-pixel SP3 may be a blue sub-pixel. The size of an opening of each of the first sub-pixel SP1, the second sub-pixel SP2, and the third sub-pixel SP3 may be determined depending on the luminance of the light. Accordingly, the size of the opening of each of the first sub-pixel SP1, the second sub-pixel SP2, and the third sub-pixel SP3 may be adjusted to represent white light by mixing lights emitted from a plurality of emissive layers. Each of the first sub-pixel SP1, the second sub-pixel SP2, and the third sub-pixel SP3 may receive a data signal containing luminance information of red, green or blue light from the display driver 120 and may output light of the respective color.

Figure 6:
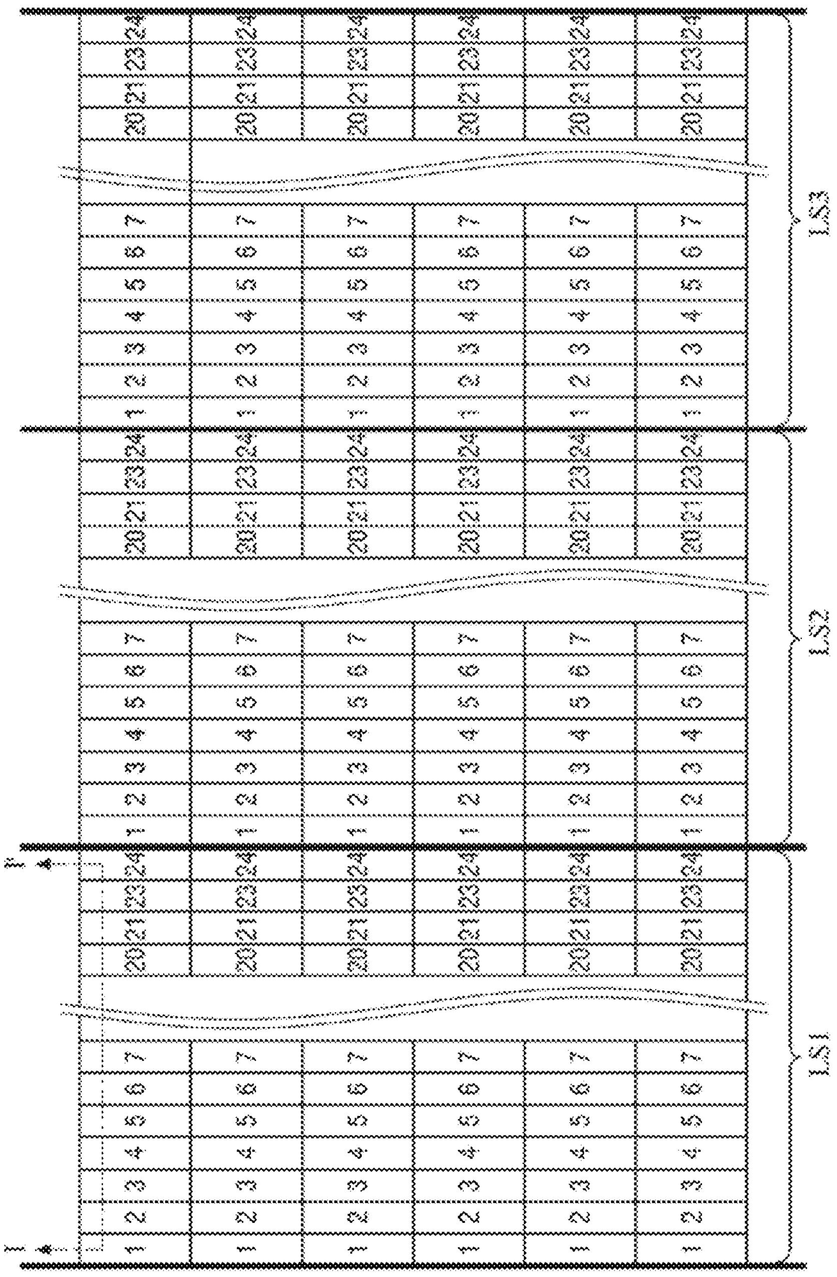
FIG. 6 is a view showing a method of setting viewpoint information for each sub-pixel according to a lens width of an optical member according to an embodiment.

FIG. 6 is a view showing a method of setting viewpoint information for each sub-pixel according to a lens width of an optical member according to an embodiment.

Referring to FIG. 6, the viewpoint information and viewpoint numbers for each sub-pixel are designated in the order of the relative positions of the sub-pixels overlapping stereoscopic lens LS1, LS2 and LS3 based on, for example, a width and a slanted angle of each of the stereoscopic lenses LS1, LS2 and LS3.

For example, the viewpoint information and viewpoint number according to the relative positions of the sub-pixels overlapping the stereoscopic lenses LS1, LS2 and LS3, respectively, may be designated repeatedly in the width direction of the stereoscopic lenses LS1, LS2 and LS3 or in the x-axis direction. This may be expressed in Equation 1 below:

$$\text{viewpoint information (or viewpoint number)} = \text{rows} \times \text{pixel size} \times \tan(\text{slanted angle}) \quad \text{[Equation 1]}$$

where "rows" denote the number of rows in the horizontal line direction, and "pixel size" denotes the width or size of each sub-pixel. In addition, "tan(slanted angle)" denotes the slant angle tθ. According to some embodiments, the lenses are arranged side-by-side in the y-axis direction (or vertical direction), and thus tan(slanted angle) is equal to 1.

The viewpoint information (or viewpoint numbers) of the sub-pixels arranged in the first horizontal line and the viewpoint information from the second horizontal line to the last horizontal line are the same in the y-axis direction (or vertical direction).

Figure 7:
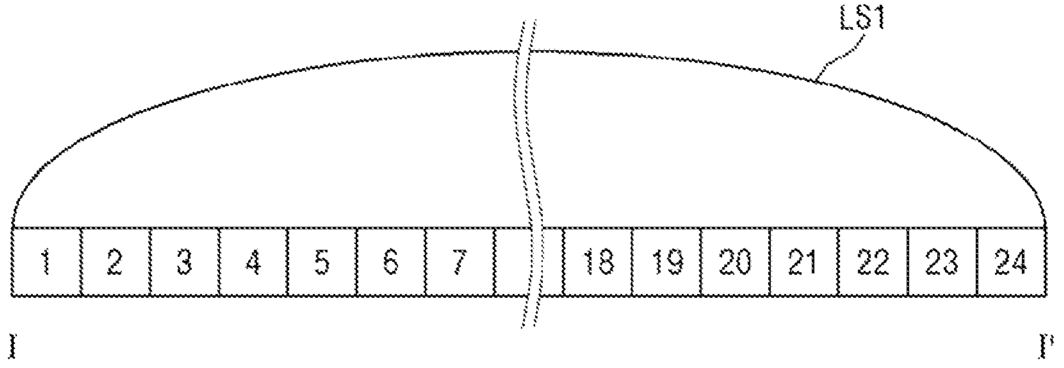
FIG. 7 is a view illustrating a method of designating viewpoint information to each sub-pixel according to the lens width and a curvature of a curved reflective panel according to an embodiment.

FIG. 7 is a view illustrating a method of designating viewpoint information to each sub-pixel according to the lens width and a curvature of a curved reflective panel according to an embodiment.

As shown in FIG. 7, viewpoint information for each of the sub-pixels may be set based on the relative positions of the sub-pixels of a first stereoscopic lens LS1, and image display points or viewpoints of the display device 290 may be set based on the viewpoint information and number of each of the sub-pixels. Similarly, viewpoint information for each of the sub-pixels may be set based on the relative positions of the sub-pixels of a second stereoscopic lens LS2 and a third stereoscopic lens LS3, and image display points or viewpoints of the display device 290 may be set based on the viewpoint information and number of each of the sub-pixels.

Accordingly, the image display points or viewpoints of the display device 290 may be in line with or lie within the width of each of the stereoscopic lenses LS1. LS2 and LS3, and may be set in the same manner as the number and the viewpoint numbers of the sub-pixels disposed on the rear surface of each of the stereoscopic lenses LS1, LS2 and LS3.

As shown in FIG. 7, the viewpoints may be in line with or lie within the width of the rear surface (or base surface or base side) of the first stereoscopic lens LS1. Similarly, the viewpoints may be in line with or lie within the width of the rear surface (or base surface or base side) of the second stereoscopic lens LS2 and the third stereoscopic lens LS3. If the number of the sub-pixels disposed on the rear surface of each of the stereoscopic lenses LS1, LS2 and LS3 is 24, there may be 24 viewpoints for detecting optical properties of the display device 290.

Figure 8:
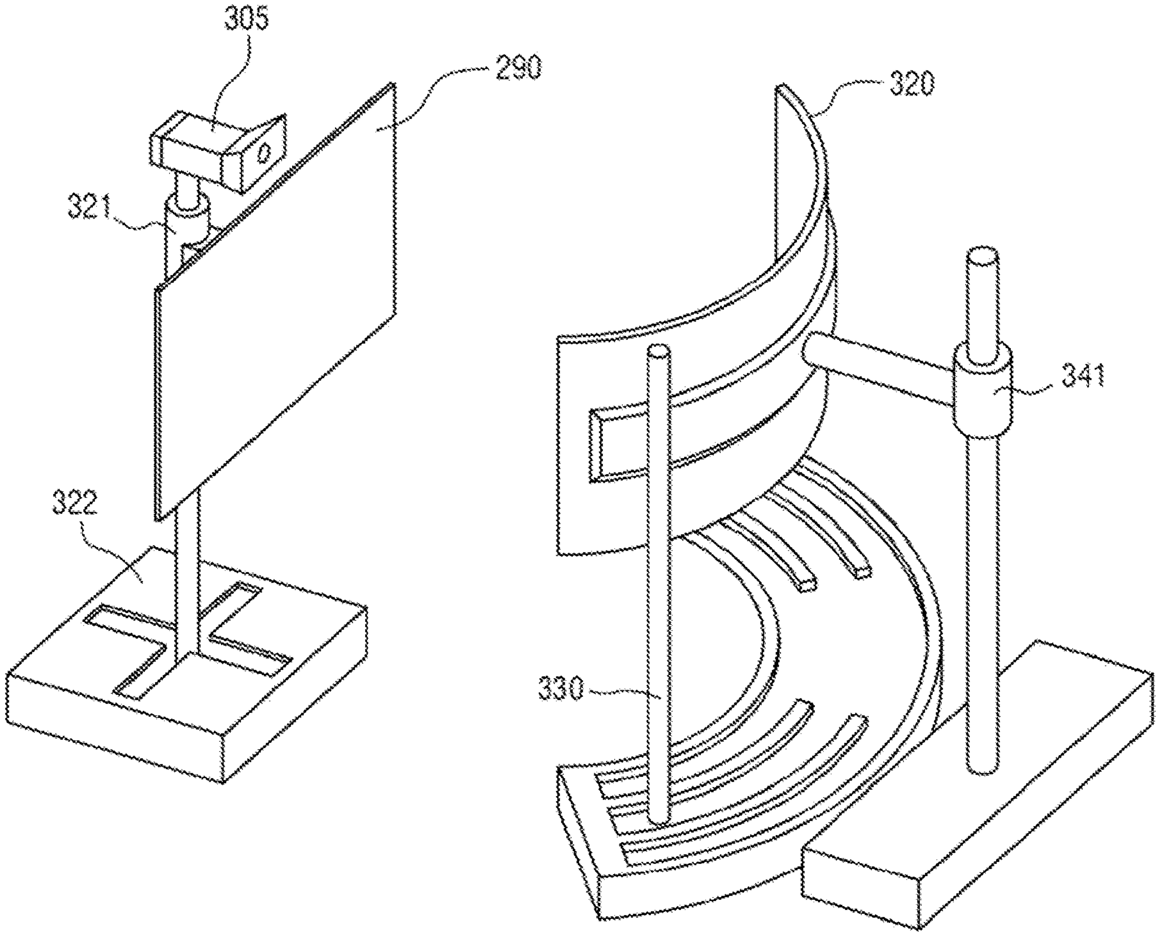
FIG. 8 is a perspective view showing an arrangement of a display device and a test apparatus according to an embodiment.

FIG. 8 is a perspective view showing an arrangement of a display device and a test apparatus according to an embodiment.

Referring to FIG. 8, a center axis or center portion of the rear surface of the curved reflective panel 320 of the test apparatus 300 may be fixed by a separate rear support 341. The inner reflection surface of the curved reflective panel 320 may be fixed so that it may maintain a predetermined curved track and radius of curvature by the pressing force of the reflection curvature converter 330.

The display device 290 may be disposed on the front side such that it faces the curved reflective panel 320. The display device 290 may display a test image toward the curved reflective panel 320. The display device 290 may be supported and fixed on the front side of the curved reflective panel 320 by a rear fixing frame 321 and a stand 322.

The image detector 305 may be disposed on the same line as the display device 290. The image detector 305 may capture a test image displayed by the display device 290 and reflected off the inner reflection surface of the curved reflective panel 320. The image detector 305 may acquire test image data according to the captured test image.

The image detector 305 may be installed on the rear fixing frame 321 of the display device 290 together with the display device 290. The image detector 305 may be installed on a separate rear fixing frame (not shown). The image detector 305 may be disposed parallel to the display device 290 on the lower side or at least one of the sides of the display device 290 as well as on the upper side of the display device 290. The image detector 305 may be integrally formed with the distance information detector 311 and the stereoscopic image analyzer 350 as a single unit or a module.

The reflection curvature converter 330 may gradually press at least one of the rear surface on the sides portions of the curved reflective panel 320 or the side portions of the curved reflective panel 320 in response to a control signal from the reflection curvature controller 340. The reflection curvature converter 330 may modulate and adjust the radius of curvature of the curved reflective panel 320.

The center portion of the rear surface of the curved reflective panel 320 may be fixed and supported by the rear support 341. The reflection curvature converter 330 may fix the center portion of the rear surface of the curved reflective panel 320 using the rear support 341. The reflection curvature converter 330 may gradually or stepwise press at least one of the side portions or the rear surface on the side portions of the curved reflective panel 320 toward the front side of the curved reflective panel 320 (e.g., toward the display device 290) in response to a control signal from the reflection curvature controller 340. The reflection curvature converter 330 may modulate and adjust the curvature radius and the curved track of the curved reflective panel 320 by stepwise pressing the side portions or the rear surface on the side portions of the curved reflective panel 320 toward the front side. The radius of curvature and the curved tack of the curved reflective panel 320 may be modulated according to the stepwise change in pressing force and angle for pressing the side portions or the rear surface on the side portions of the curved reflective panel toward the front side.

Figure 9:
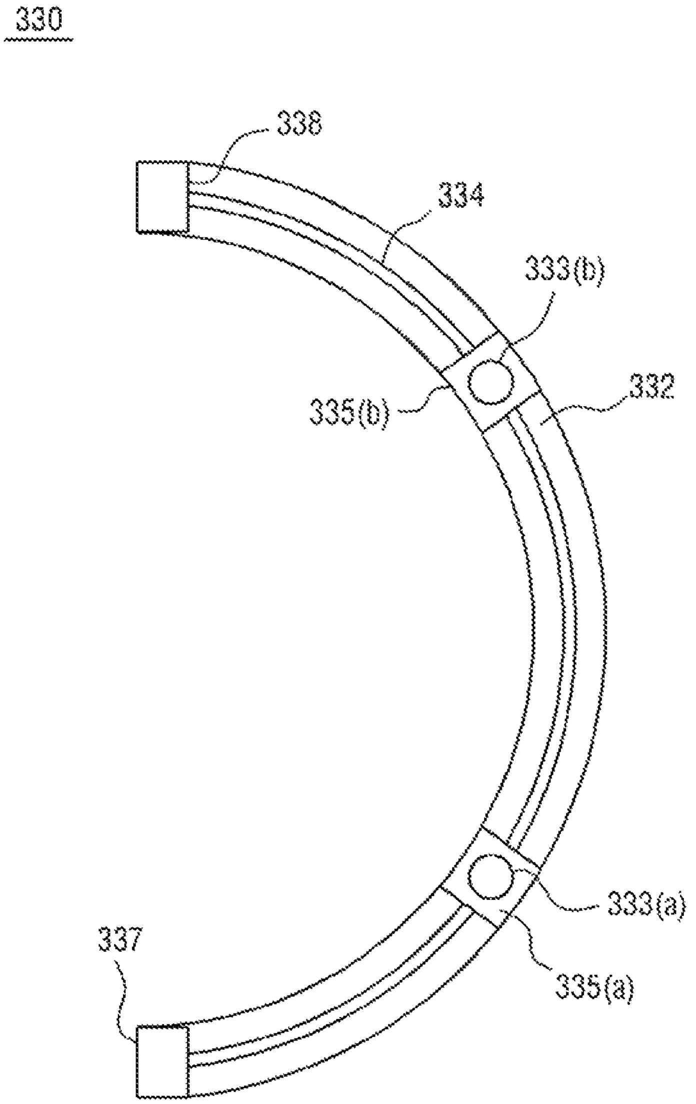
FIG. 9 is a top view showing a portion of a reflection curvature converter according to an embodiment.

FIG. 9 is a top view showing a portion of a reflection curvature converter according to an embodiment.

Referring to FIG. 9, the reflection curvature converter 330 may include a first pressing rod 333(*a*) and a second pressing rod 333(*b*), a first moving member 335 (*a*) and a second moving member 335(*b*), at least one moving rail 334, at least one moving groove 332, and a first driving motor 337 and a second driving motor 338.

The first pressing rod 333(*a*) and the second pressing rod 333(*b*) may be disposed on the side portions or on the rear surface on the side portions of the curved reflective panel 320, and may be in contact with the side portions or the rear surface on the side portions of the curved reflective panel 320. The first pressing rod 333(*a*) and the second pressing rod 333(*b*) may support the side portions or the rear surface on the side portions of the curved reflective panel 320, and may press them toward the front side of the curved reflective panel 320 to fix the curved reflective panel 320 so that the curved reflective panel 320 may form and maintain the curvature.

The first moving member 335(*a*) and the second moving member 335(*b*) may support at least one of one end portion and an opposite end portion of the first pressing rod 333(*a*) and the second pressing rod 333(*b*) to move the first pressing rod 333(*a*) and the second pressing rod 333(*b*), respectively. Specifically, the first moving member 335(*a*) and the second moving member 335(*b*) may be assembled with at least one of the upper end and the lower end of the first pressing rod 333(*a*) and the second pressing rod 333(*b*) to move the first pressing rod 333(*a*) and the second pressing rod 333(*b*), respectively, toward the front side or the rear side of the curved reflective panel 320.

The at least one moving rail 334 may form or define a moving path of the first moving member 335(*a*) and the second moving member 335(*b*). The at least one moving rail 334 may be formed as a track with a predetermined curvature or may be disposed along a predetermined radius of curvature.

The at least one moving groove 332 together with the at least one moving rail 334 may form or define the moving path of the first moving member 335(*a*) and the second moving member 335(*b*). The at least one moving rail 334 may be located inside the moving groove 332.

The first driving motor 337 and the second driving motor 338 may move the first moving member 335(*a*) and the second moving member 335(*b*), respectively, along the at least one moving rail 334 in response to a control signal. The first driving motor 337 and the second driving motor 338 may be formed integrally with the first moving member 335(*a*) and the second moving member 335(*b*) and may move the first moving member 335(*a*) and the second moving member 335(*b*), respectively. Alternatively, the first driving motor 337 and the second driving motor 338 may move the first moving member 335(*a*) and the second moving member 335(*b*) by using a wire or a conveyor module.

Figure 10:
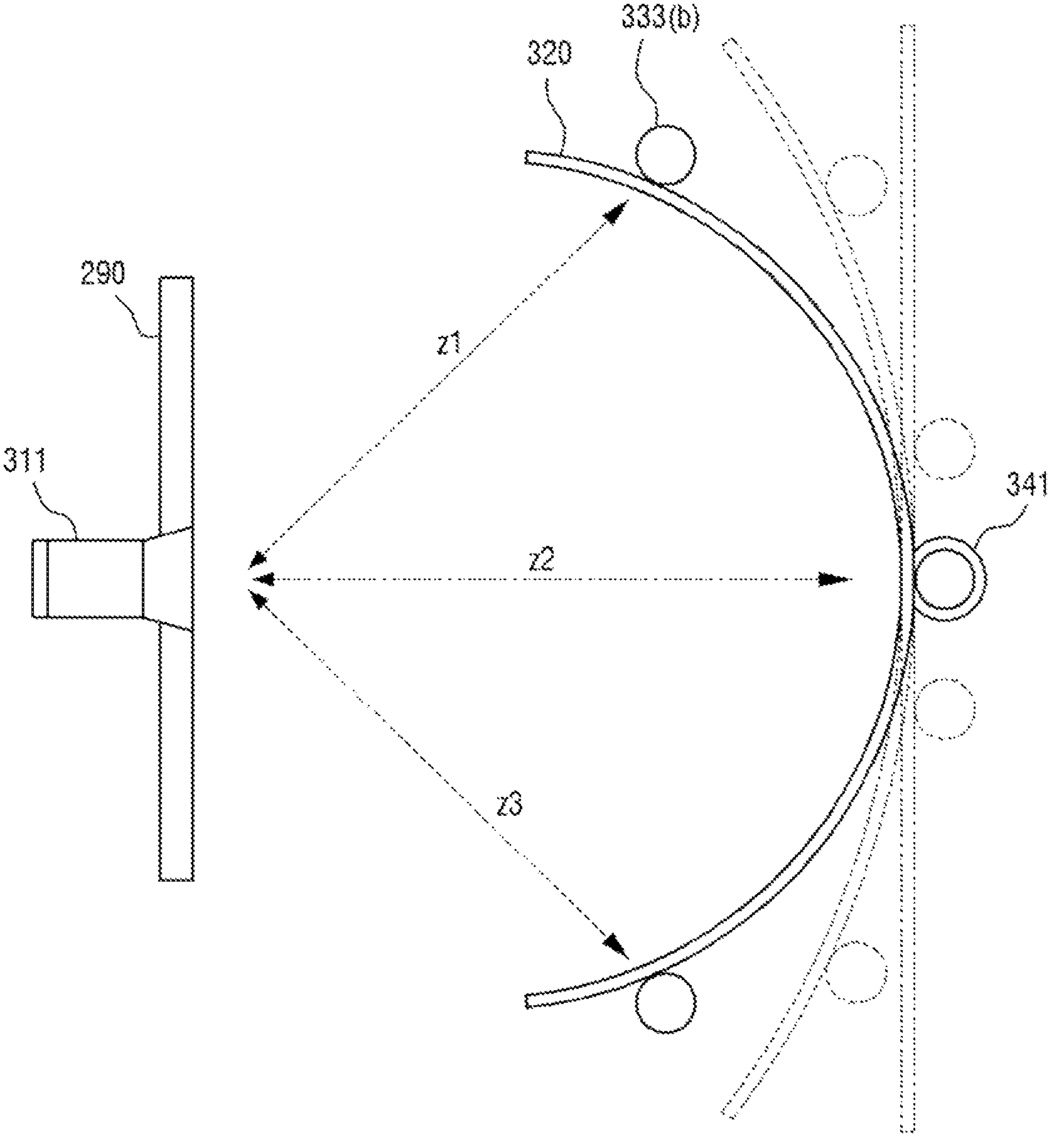
FIG. 10 is a top view illustrating a method of adjusting the curvature of the curved reflective panel according to an embodiment.
Figure 11:
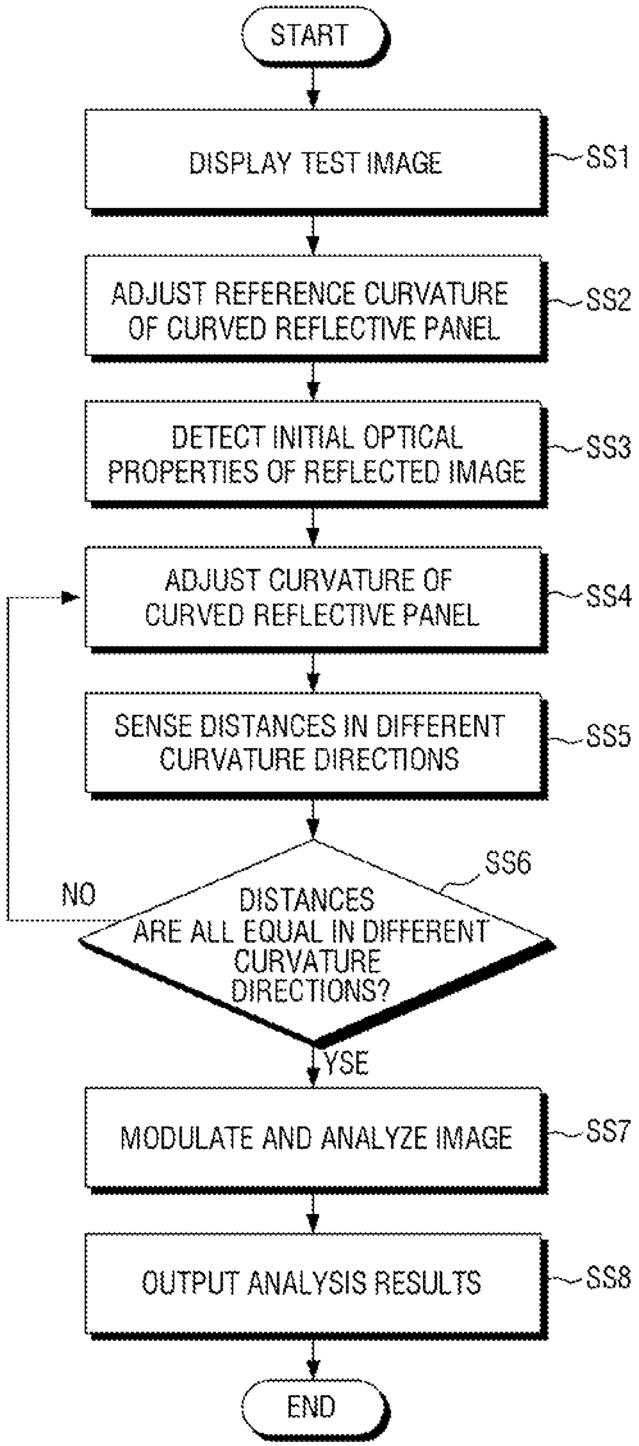
FIG. 11 is a flowchart illustrating a method of adjusting the curvature of the curved reflective panel and a method of acquiring and analyzing an image according to FIG. 10.

FIG. 10 is a top view illustrating a method of adjusting the curvature of the curved reflective panel according to an embodiment. FIG. 11 is a flowchart illustrating a method of adjusting the curvature of the curved reflective panel and a method of acquiring and analyzing an image according to FIG. 10.

Referring to FIG. 10 and FIG. 11, the display device 290 may be disposed on the front side of the curved reflective panel 320 and may display test images sequentially or simultaneously for different viewpoints (step SS1). The reflection curvature converter 330 may press at least one of the rear surface and the side portions of the curved reflective panel 320 in response to an initial control signal from the reflection curvature controller 340. The reflection curvature converter 330 may change the shape of the curved reflective panel 320 so that it has an initially set reference curvature in response to the initial control signal (step SS2).

The image detector 305 may capture test images displayed by the display device 290 and reflected off the inner reflection surface of the curved reflective panel 320 having the initially set reference curvature. In addition, the image detector 305 may check test image data reflected off the inner reflection surface of the curved reflective panel 320, and may detect optical property information (e.g., illuminance, luminance, brightness, etc.) of the test images (step SS3).

The reflection curvature controller 340 may generate control signals stepwise so that the curvature of the curved reflective panel 320 may gradually decrease or increase. The reflection curvature controller 340 may provide the control signals to the reflection curvature converter 330. The reflection curvature converter 330 may adjust the curvature of the curved reflective panel 320 in response to the control signals from the reflection curvature controller 340 stepwise (step SS4).

The distance information detector 311 may detect distance information z1, 22 and z3 between the display device 290 and the curved reflective panel and the radius of curvature of the curved reflective panel (step SS5). The distance information detector 311 may measure the center distance 22 between the display device 290 and the center of the inner reflection surface of the curved reflective panel, the distances z1 and 23 between the display device 290 and the side portions, and the distances at angles of fan shapes. In addition, the distance information detector 311 may measure the distance between the display device 290 and the inner reflection surface of the curved reflective panel according to a predetermined rotation radius or rotation angle, and thereby may detect curvature radius information of the curved reflective panel 320, etc.

The reflection curvature controller 340 may receive from the distance information detector 311 one or more of the distance information z1, 22 and z3 between the display device 290 and the curved reflective panel, curvature information of the curved reflective panel 320, or curvature radius information on the curved reflective panel 320. The reflection curvature controller 340 may generate stepwise control signals for gradually adjusting the curvature radius of the curved reflective panel 320 so that the distance information z1, 22 and 23 on the curved reflective panel detected by the distance information detector 311 may be made equal. The reflection curvature controller 340 may supply the control signals generated stepwise to the reflection curvature converter 330 so that the curvature of the curved reflective panel 320 may be adjusted by the reflection curvature converter 330.

The reflection curvature controller 340 may generate, stepwise, the control signals for gradually adjusting the curvature of the curved reflective panel 320 so that the curvatures of the curved reflective panel 320 or the radii of curvature of the curved reflective panel 320 may be made equal.

Once the distance information z1, 22 and z3 between the display device 290 and the curved reflective panels have been equalized (step SS6), the reflection curvature controller 340 may not generate or transmit control signals and may keep the radius of curvature of the curved reflective panel 320 by the reflection curvature converter 330. For example, once the distance information z1, 22 and z3 between the display device 290 and the curved reflective panels have been equalized, the reflection curvature controller 340 may stop generating or transmitting the control signals.

Once the distance information z1, 22 and z3 between the display device and the curved reflective panel have been equalized, the image detector 305 may capture the curved reflective panel 320 and may detect test image data associated with a test image reflected off the curved reflective panel 320. Accordingly, the stereoscopic image analyzer 350 may analyze the grayscale value or the luminance value of the test image data acquired by the image detector 305 and analyze the amount of crosstalk for each viewpoint (step SS7).

The stereoscopic image analyzer 350 may sort the test image data acquired by the image detector 305 by pixel data, and may analyze the grayscale value (red, green and blue grayscale values) and luminance values for each pixel data. Subsequently, the stereoscopic image analyzer 350 may derive a crosstalk analysis result value for each viewpoint using a predetermined formula for calculating a crosstalk ratio. The crosstalk analysis result value may be displayed or output by a separate monitor (step SS8).

Figure 12:
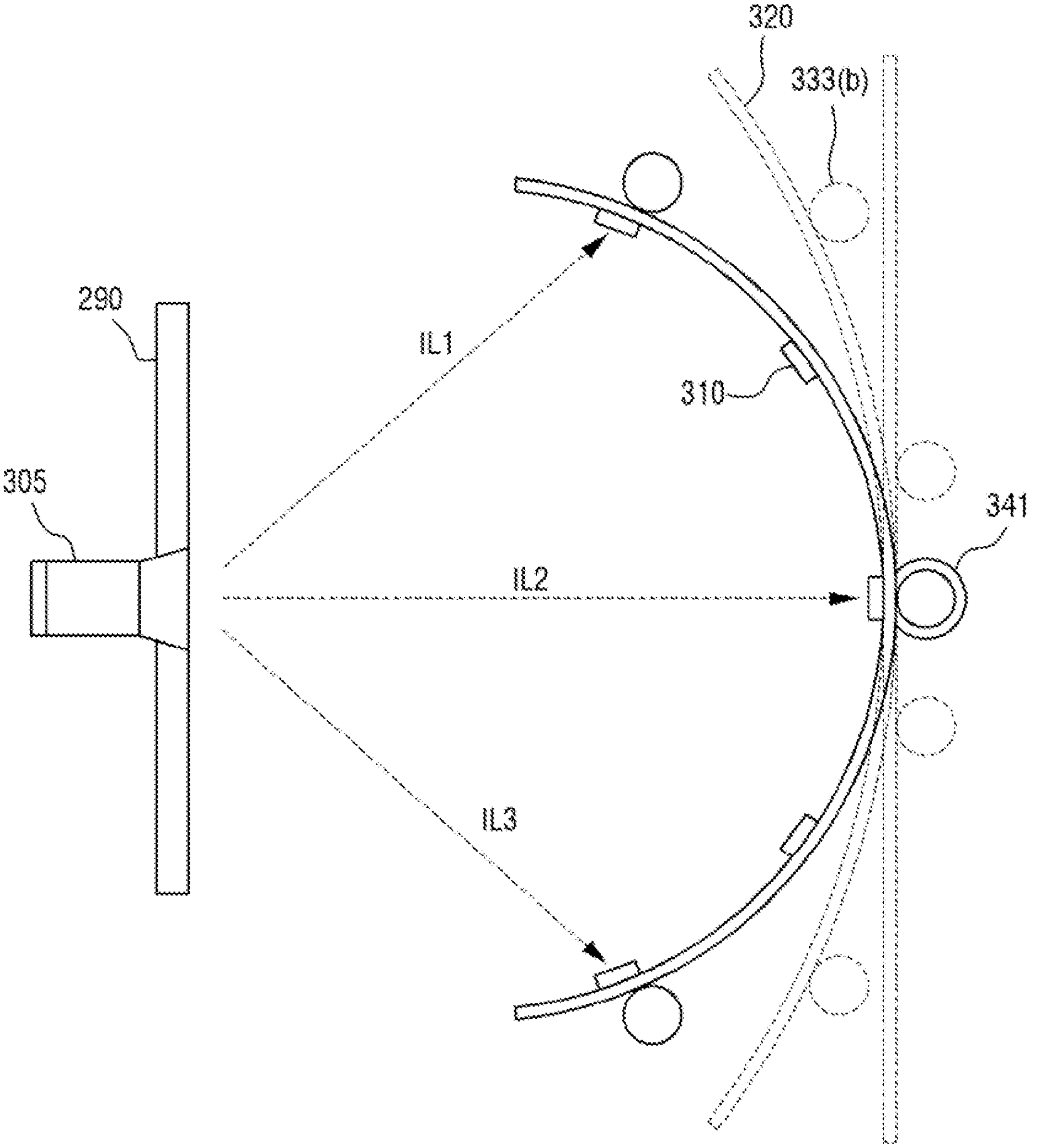
FIG. 12 is a top view illustrating another method of adjusting the curvature of the curved reflective panel according to an embodiment.
Figure 13:
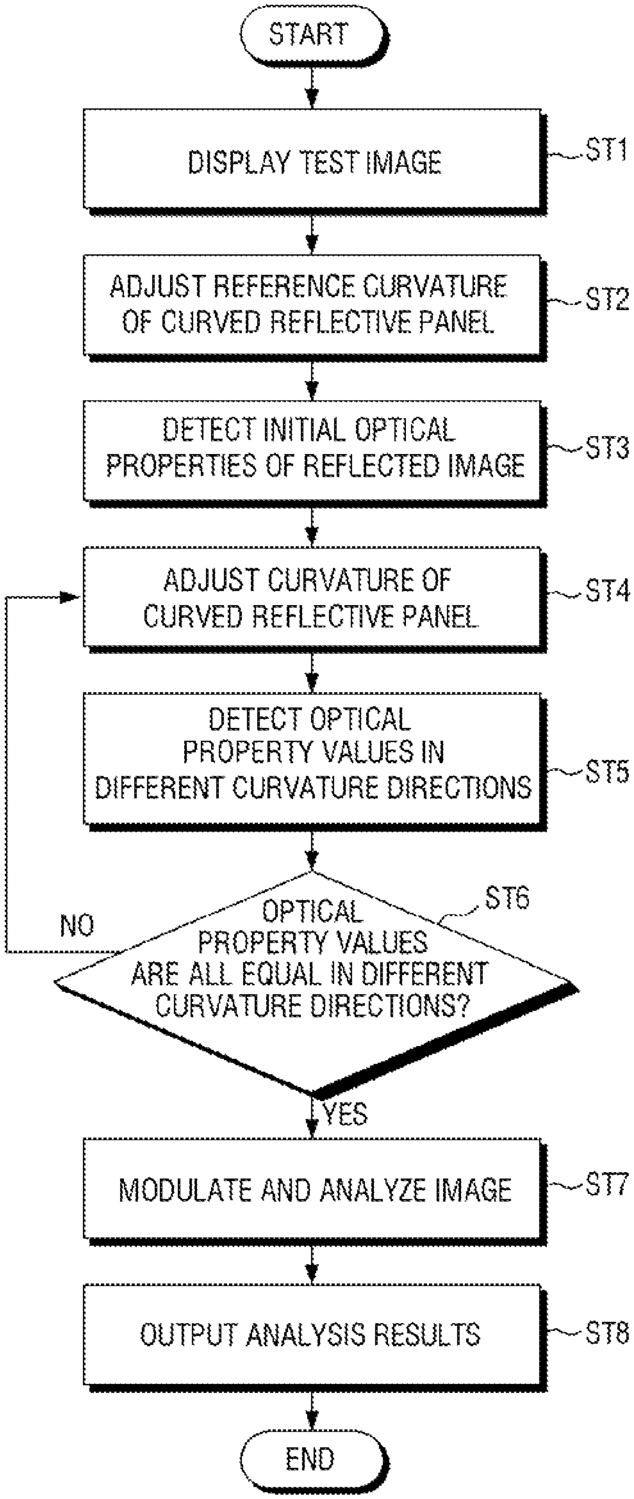
FIG. 13 is a flowchart illustrating a method of adjusting the curvature of a curved reflective panel and a method of acquiring and analyzing an image according to FIG. 12.

FIG. 12 is a top view illustrating another method of adjusting the curvature of the curved reflective panel according to an embodiment. FIG. 13 is a flowchart illustrating a method of adjusting the curvature of a curved reflective panel and a method of acquiring and analyzing an image according to FIG. 12.

Referring to FIG. 12 and FIG. 13, the display device 290 may be disposed on the front side of the curved reflective panel 320 and may displays test images sequentially or simultaneously for different viewpoints (step ST1). The reflection curvature converter 330 may press at least one of the rear surface and the side portions of the curved reflective panel 320 in response to an initial control signal from the reflection curvature controller 340. The reflection curvature converter 330 may change the shape of the curved reflective panel 320 so that it has an initially set reference curvature in response to the initial control signal (step ST2).

The image detector 305 may capture test images displayed by the display device 290 and reflected off the inner reflection surface of the curved reflective panel 320 having the initially set reference curvature. In addition, the image detector 305 may check test image data reflected off the inner reflection surface of the curved reflective panel 320, and may detect optical property information (e.g., illuminance, luminance, brightness, etc.) of the test images (step ST3).

The reflection curvature controller 340 may generate control signals stepwise so that the curvature of the curved reflective panel 320 may gradually decrease or increase. The reflection curvature controller 340 may provide the control signals to the reflection curvature converter 330. The reflection curvature converter 330 may adjust the curvature of the curved reflective panel 320 in response to the control signals from the reflection curvature controller 340 step-by-step (step ST4).

A plurality of optical property detectors 310 may be disposed at a predetermined spacing on the inner reflection surface of the curved reflective panel 320 facing the display device 290. Each of the optical property detectors 310 may detect optical property values of a test image displayed on the display device 290 (e.g., illuminance values IL1, IL2 and IL3). The optical property detectors 310 may be arranged in a fan shape at a predetermined spacing on the inner reflection surface of the curved reflective panel maintaining a predetermined radius of curvature. The optical property detectors 310 may be arranged side-by-side at a predetermined spacing on at least one of an upper part of the inner surface, a lower part of the inner surface, or the center of the inner surface of the curved reflective panel. The optical property detectors 310 may detect the optical property values of the test image, for example, the illuminance values IL1, IL2 and IL3 (step ST5).

The reflection curvature controller 340 may generate stepwise control signals for gradually adjusting the radius of curvature of the curved reflective panel so that the optical property values (e.g., illuminance values IL1, IL2 and IL3) detected through the plurality of optical property detectors 310 may be made equal. The reflection curvature controller 340 may supply the control signals for adjusting the radius of curvature to the reflection curvature converter 330 to control the degrees of modulation and adjustment of the radius of curvature of the reflection curvature converter 330.

Once the optical property values (e.g., illuminance values IL1, IL2 and IL3) detected through the plurality of optical property detectors 310 have been equalized (step ST6), the reflection curvature controller 340 may not generate or transmit control signals and may keep the radius of curvature of the curved reflective panel 320 by the reflection curvature converter 330. For example, once the optical property values (e.g., illuminance values IL1, IL2 and IL3) detected through the plurality of optical property detectors 310 have been equalized, the reflection curvature controller 340 may stop generating or transmitting the control signals.

Once the optical property values (e.g., illuminance values) detected through the plurality of optical property detectors 310 have been equalized, the image detector 305 may capture the curved reflective panel 320 and may detect test image data associated with a test image reflected off the curved reflective panel 320. Accordingly, the stereoscopic image analyzer 350 may analyze the grayscale value or the luminance value of the test image data acquired by the image detector 305 and may analyze an amount of crosstalk for each viewpoint (step ST7).

The stereoscopic image analyzer 350 may sort the test image data acquired by the image detector 305 by pixel data, and may analyze the grayscale value (red, green and blue grayscale values) and luminance values for each pixel data. Subsequently, the stereoscopic image analyzer 350 may derive a crosstalk analysis result value for each viewpoint using a predetermined formula for calculating crosstalk ratio. The crosstalk analysis result value may be displayed or output by a separate monitor (step ST8).

Figure 14:
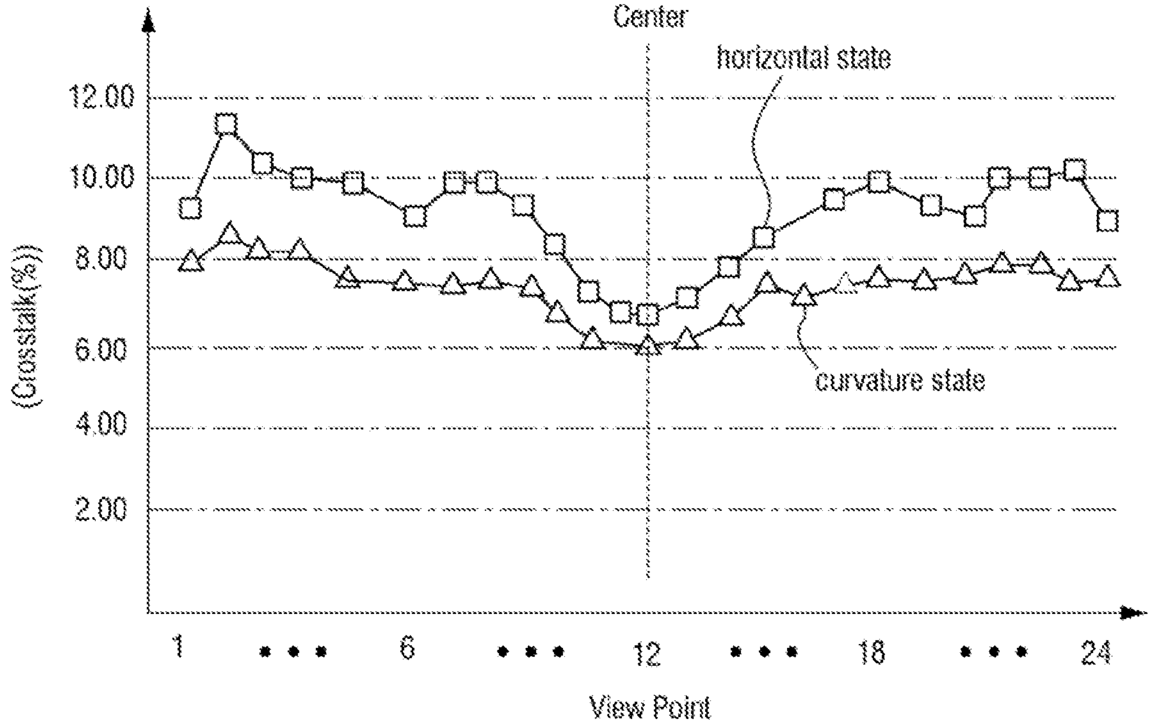
FIG. 14 is a graph showing a difference in magnitude of crosstalk between a horizontal state and a curved state of a curved reflective panel according to an embodiment.

FIG. 14 is a graph showing a difference in magnitude of crosstalk between a horizontal state and a curved state of a curved reflective panel according to an embodiment.

Referring to FIG. 14, the stereoscopic image analyzer 350 may analyze the grayscale value or the luminance value of the test image data acquired by the image detector 305 and may analyze the amount of crosstalk for each viewpoint.

It can be seen from the analyze results that the result data of acquiring and analyzing the test image when the curved reflective panel 320 has a relatively uniform curved shape (curvature state), compared to the result data of acquiring and analyzing the test image when the curved reflective panel 320 has a relatively flat shape (curvature state).

Referring to FIG. 14, the stereoscopic image analyzer 350 may sort the test image data acquired by the image detector 305 by pixel data, and may analyze the grayscale value (red, green and blue grayscale values) and luminance values for each pixel data. The stereoscopic image analyzer 350 may derive a crosstalk analysis result value for each viewpoint using a predetermined formula for calculating crosstalk ratio. The formula for calculating crosstalk ratio may be expressed as Equation 2 below:

$$CT(n\text{-}view) = \frac{\text{Sum Undisirable flux}}{\text{Intended flux}} \quad \text{[Equation 2]}$$

Referring to Equation 2 above, the stereoscopic image analyzer 350 may compare and analyze the sum of luminance characteristics values (Undesirable flux) or the average luminance characteristics values of the viewpoints, except a viewpoint of interest, relative to the luminance characteristics value for the viewpoint of interest (Intended flux) to derive the analysis result value CT (n-view). For example, the stereoscopic image analyzer 350 may compare the luminance characteristics value of each viewpoint (Intended flux) with the luminance characteristics values of the other of the viewpoints (Sum Undesirable flux) to analyze them in a leave-one-out method. In addition, the reflection curvature converter 330 may extract, from a memory or a register, a correction coefficient that is inversely proportional to the analysis result value CT(n-view) so that a difference between the luminance characteristics value for each viewpoint (Intended flux) and the sum of luminance characteristics values of the other viewpoints (Sum Undesirable flux) may be reduced or minimized.

The correction coefficient for each viewpoint may be set in inverse proportion to the difference value between the luminance characteristics value for each viewpoint (Intended flux) and the sum of luminance characteristics values of the other viewpoints (Sum Undesirable flux). The correction coefficient for each viewpoint may be stored in a memory or a register in advance. In addition, the correction coefficient for each viewpoint may be set in advance based on a number of experimental results and calculation results in a database.

Figure 15:
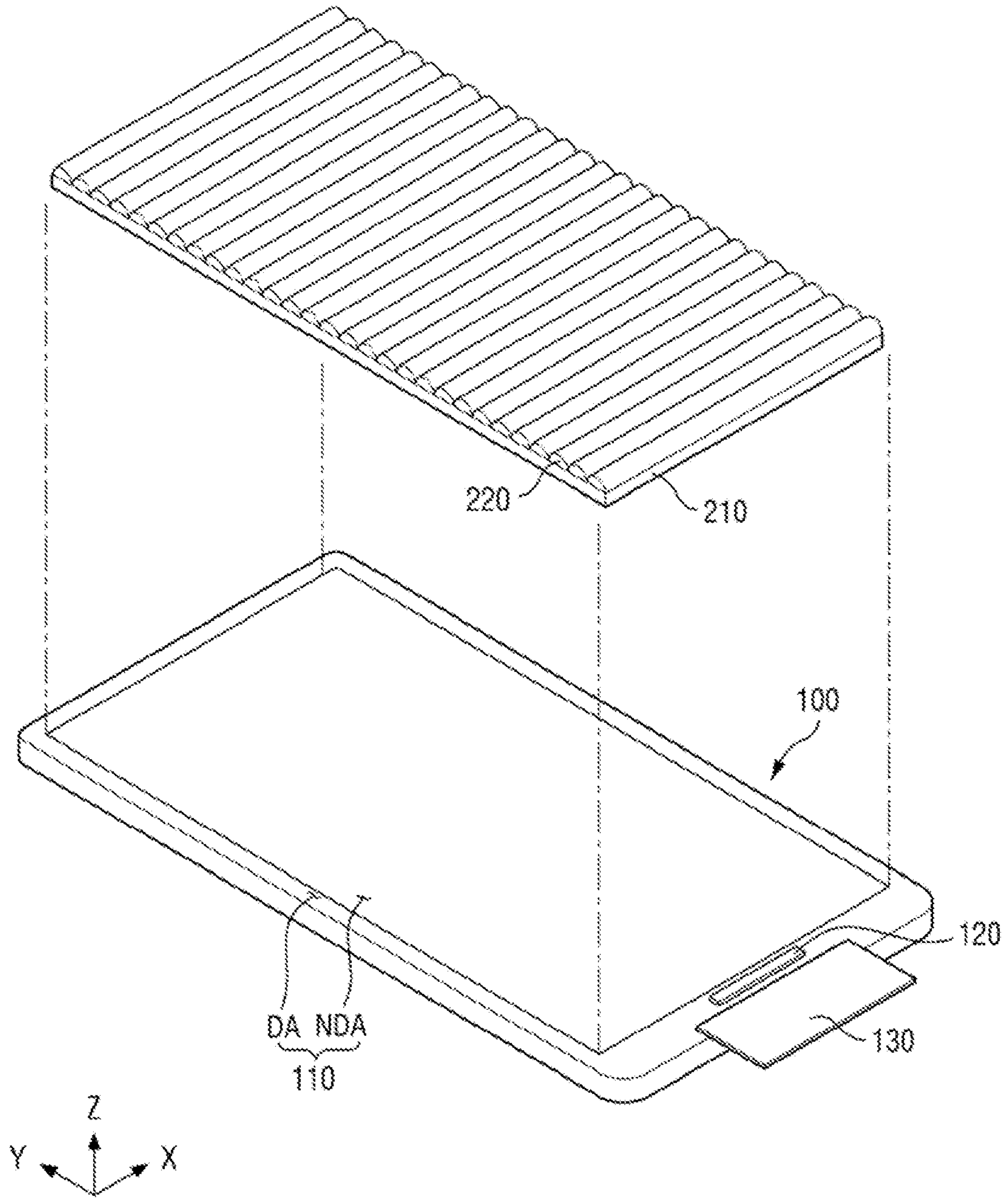
FIG. 15 is an exploded, perspective view of a display device according to another embodiment of the present disclosure.
Figure 16:
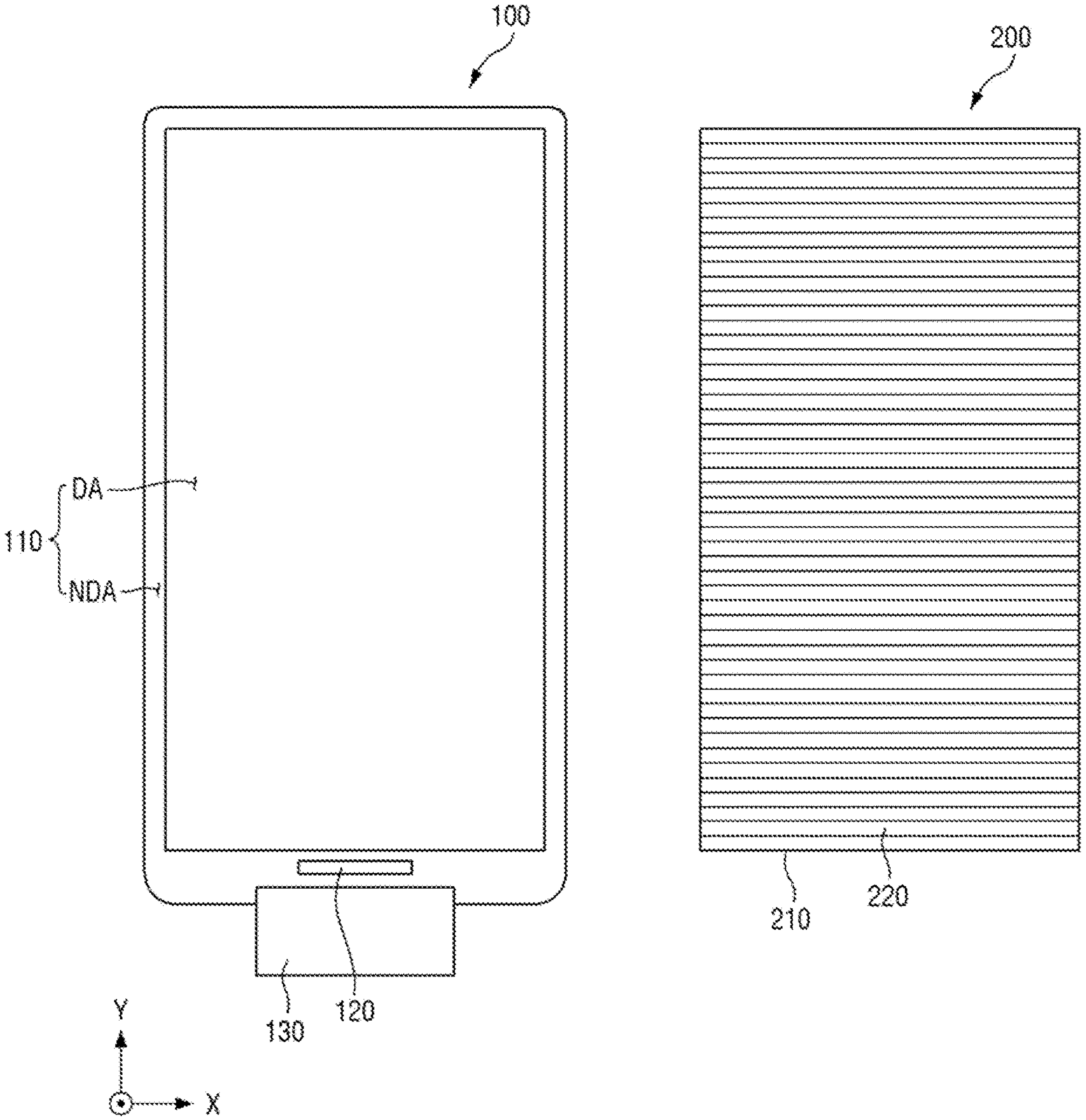
FIG. 16 is a plan view showing the display panel and the optical member shown in FIG. 15.

FIG. 15 is an exploded, perspective view of a display device according to another embodiment of the present disclosure. FIG. 16 is a plan view showing the display panel and the optical member shown in FIG. 15.

Referring to FIG. 15 and FIG. 16, a display device according to another embodiment may be implemented as a flat-panel display device such as an organic light-emitting display (OLED), and may be a 3D display including the display module 100 and the optical member 200.

The display module 100 may include a display panel 110, a display driver 120, and a circuit board 130.

The display panel 110 may include a display area DA and a non-display area NDA. The display area DA may include data lines, scan lines, supply voltage lines, and a plurality of pixels connected to the data lines and scan lines.

The optical member 200 may be disposed on the display module 100. The optical member 200 may be attached to a surface of the display module 100 through an adhesive member, for example. The optical member 200 may be attached to the display module 100 by a panel bonding apparatus, for example. The optical member 200 may be implemented as a lenticular lens sheet including a plurality of stereoscopic lenses LS1 to LS2.

Figure 17:
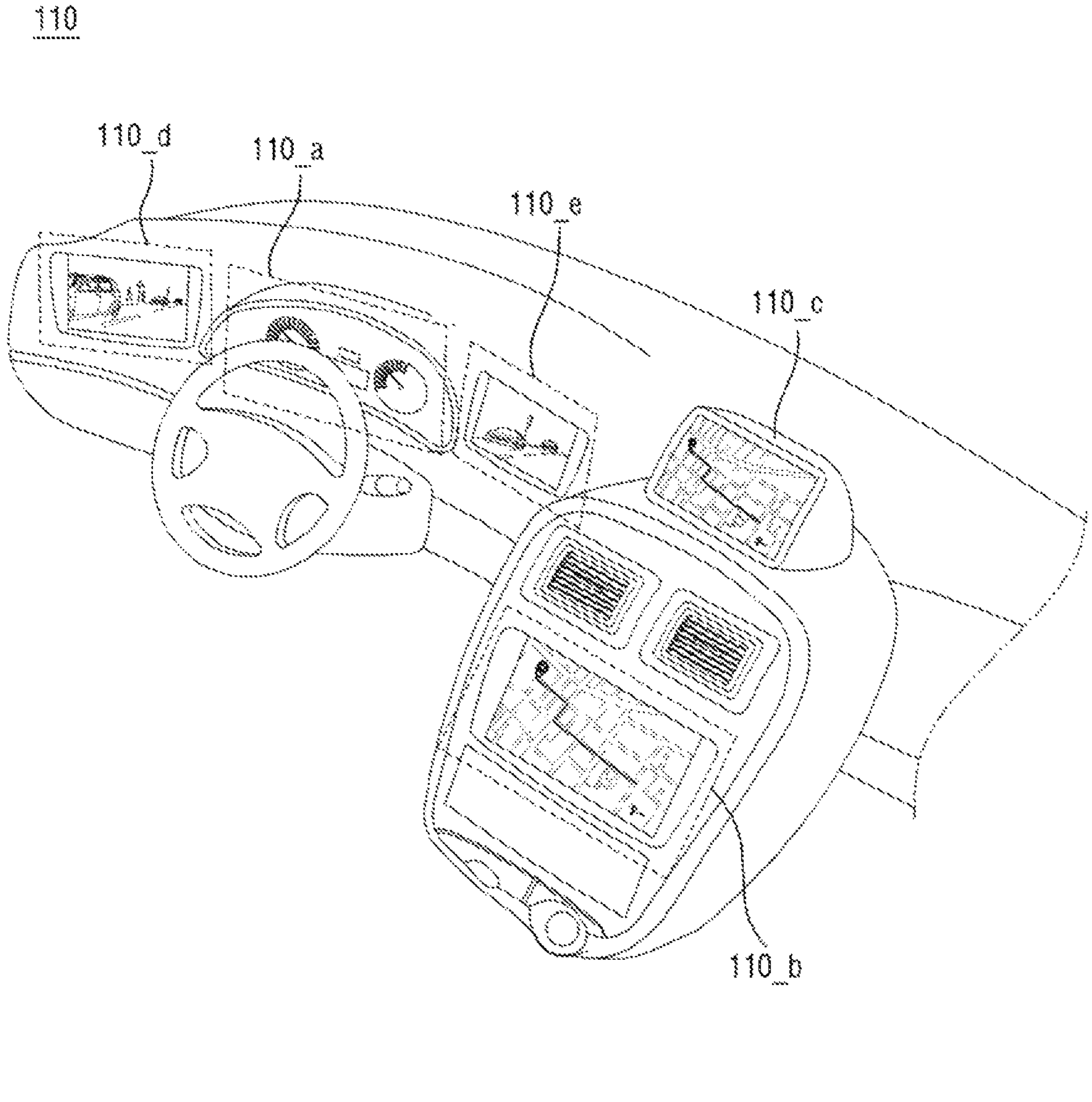
FIG. 17 is a view showing an example of an instrument cluster and a center fascia including display devices according to an embodiment.

FIG. 17 is a view showing an example of an instrument cluster and a center fascia including display devices according to an embodiment.

Referring to FIG. 17, the display device according to an embodiment in which the display module 100 and the optical member 200 are attached together may be applied to an instrument cluster 10_*a* of a vehicle, a center fascia 10_*b* of a vehicle, or a center information display (CID) 10_*c* disposed on the dashboard of a vehicle. In addition, the display device according to an embodiment may be implemented as mirror displays 10_*d* and 10_*e*, which can replace side mirrors of a vehicle, a navigation device, etc.

Figure 18:
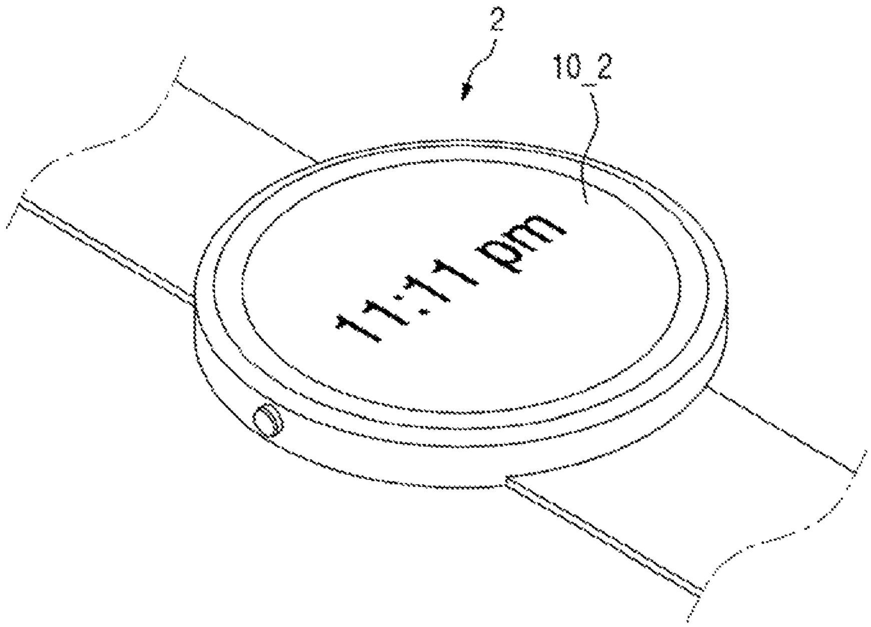
FIG. 18 is a view showing an example of a watch-type smart device including a display device according to an embodiment of the present disclosure.

FIG. 18 is a view showing an example of a watch-type smart device including a display device according to an embodiment of the present disclosure.

FIG. 18 shows an example of a watch-type smart device 2 including the display device according to an embodiment. The display device may be implemented as a watch face display 10_2 according to an embodiment.

Figure 19:
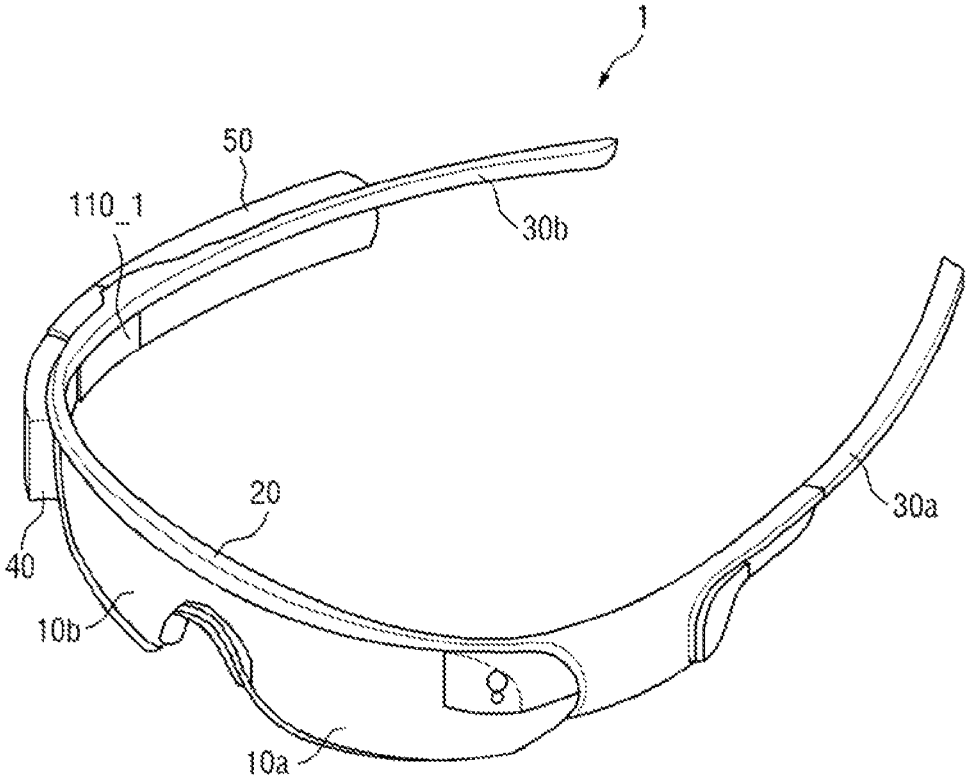
FIG. 19 is a view showing an example of a glasses-type virtual reality device including a display device according to an embodiment.

FIG. 19 is a view showing an example of a glasses-type virtual reality device including a display device according to an embodiment.

FIG. 19 shows an example of a glasses-type virtual reality device 1 including eyeglass temples 30*a* and 30*b*. The glasses-type virtual reality device 1 according to an embodiment of the present disclosure may include a glasses-type display device 110_1, a left eye lens 10*a*, a right eye lens 10*b*, a support frame 20, eyeglass temples 30*a* and 30*b*, a reflective member 40, and a display case 50.

The glasses-type virtual reality device 1 according to an embodiment may be applied to a head-mounted display including a band that can be worn on the head, which may replace the eyeglass temples 30*a* and 30*b*. That is to say, the glasses-type virtual reality device 1 is not limited to that shown in FIG. 19 and may be applied to a variety of electronic devices in a variety of forms.

The display case 50 may include the display device 10_1 such as a micro-LED display device and the reflective member 40. An image displayed on the glasses-type display device 110_1 may be reflected by the reflective member 40 and provided to the user's right eye through the right eye lens 10*b*. Accordingly, the user may watch a virtual reality image displayed on the display device through the right eye.

Although the display case 50 may be disposed at the right end of the support frame 20 in the example shown in FIG. 19, embodiments of the present disclosure are not limited thereto. For example, the display case 50 may be disposed at the left end of the support frame 20. In such case, an image displayed on the glasses-type display device 110_1 may be reflected by the reflective member 40 and provided to the user's left eye through the left eye lens 10*a*. Accordingly, the user may watch a virtual reality image displayed on the glasses-type display device 110_1 through the left eye. Alternatively, the display cases 50 may be disposed at both the left end and the right end of the support frame 20, respectively. In such case, the user can watch a virtual reality image displayed on the display device 10_1 through both the left and right eyes.

Figure 20:
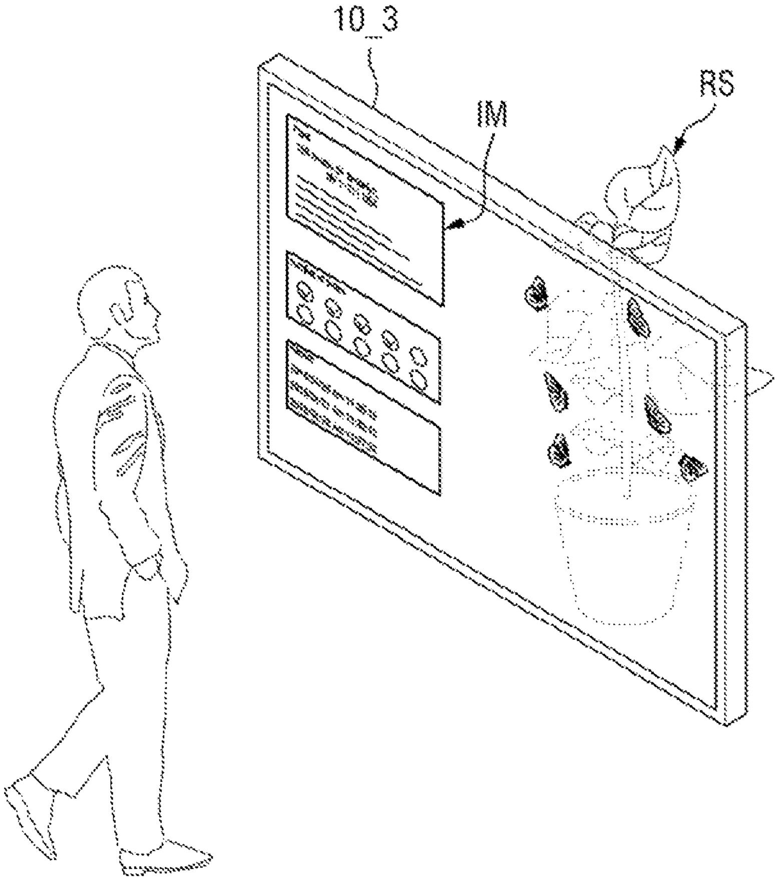
FIG. 20 is a view showing an example of a transparent display apparatus including a transparent display device according to an embodiment.

FIG. 20 is a view showing an example of a transparent display device including a transparent display device according to an embodiment.

Referring to FIG. 20, a display device in which the display module 100 and the optical member 200 are attached together may be applied to a transparent display apparatus. The transparent display device may transmit light while displaying images IM. Therefore, a user located on a front side of the transparent display device can watch the images IM displayed on the display module 100 and also watch an object RS or the background located on the rear side of the transparent display device. When the display device in which the display module 100 and the optical member 200 are attached together is applied to the transparent display device, a display panel 10_3 of the display device may include a light-transmitting portion that can transmit light or may be made of a material that can transmit light.

In concluding the detailed description, those skilled in the art will appreciate that many variations and modifications can be made to preferred embodiments without substantially departing from the principles of the present disclosure. Therefore, disclosed preferred embodiments of the disclosure are used in a generic and descriptive sense only and not for purposes of limitation.

What is claimed is:

1. A display device comprising:

a display panel comprising a plurality of sub-pixels connected to a data line;

an optical member on the display panel and comprising a plurality of stereoscopic lenses overlapping the sub-pixels; and a display driver configured to drive the display panel, and wherein the display driver is further configured to align image data input according to relative positions of the sub-pixels, to correct the image data for each viewpoint of a plurality of viewpoints by calculating corrected image data for each viewpoint using a plurality of correction coefficients including a respective correction coefficient calculated for each of the viewpoints, and to generate data voltages corresponding to the corrected image data for different viewpoints, wherein the display driver supplies the data voltages to the data line and the plurality of sub-pixels.

2. The display device of claim 1, disposed in an electronic device, wherein the display driver designates a viewpoint of the plurality of viewpoints and a viewpoint number to each of the sub-pixels based on relative positions of the sub-pixels for each of the plurality of stereoscopic lenses of the optical member, aligns positions of the image data according to the viewpoint and the viewpoint number of each of the sub-pixels, wherein the display panel displays an image in a display area of the display panel using the corrected image data.

3. The display device of claim 2, wherein the display driver generates the corrected image data for each of the plurality of viewpoints by adding/subtracting the correction coefficient to/from the image data for each of the plurality of viewpoints, generates data voltages corresponding to the corrected image data, and provides the data voltages to the display panel.

4. The display device of claim 2, wherein the display driver generates the corrected image data for each of the plurality of viewpoints by multiplying the correction coefficient for each of the plurality of viewpoints by the image data for each of the plurality of viewpoints, generates data voltages corresponding to the corrected image data, and provides the data voltages to the display panel.

5. A test apparatus for testing a display device, the test apparatus comprising:

a plurality of optical property detectors arranged at a predetermined spacing on an inner reflection surface of a curved reflective panel facing a display panel of the display device and detecting optical property values of a test image displayed by the display panel;

a distance information detector detecting distance information between the display panel and the curved reflective panel and a radius of curvature of the curved reflective panel;

a reflection curvature converter modulating the radius of curvature of the curved reflective panel;

a reflection curvature controller controlling the reflection curvature converter according to at least one of an optical property value of the test image or the radius of curvature of the curved reflective panel;

an image detector acquiring test image data by capturing the test image reflected off the curved reflective panel; and a stereoscopic image analyzer analyzing an amount of crosstalk for a plurality of viewpoints of the display device by analyzing at least one of a grayscale value or luminance value of the test image data.

6. The test apparatus of claim 5, wherein the plurality of optical property detectors are arranged in a fan shape at a predetermined spacing on the inner reflection surface of the curved reflective panel maintaining the radius of curvature, such that the plurality of optical property detectors detect illuminance values of the test image displayed by the display panel.

7. The test apparatus of claim 5, wherein the distance information detector measures a distance between the display panel and the inner reflection surface of the curved reflective panel, distances between the display panel and side portions of the curved reflective panel, and distances at angles of fan shapes using at least one of a plurality of ultrasonic sensors or a plurality of infrared sensors.

8. The test apparatus of claim 5, wherein the distance information detector detects curvature information and curvature radius information of the curved reflective panel by measuring a distance between the display panel and the inner reflection surface of the curved reflective panel according to at least one of a predetermined rotation radius or rotation angle.

9. The display device of claim 5, wherein the reflection curvature controller generates control signals to control the reflection curvature converter to adjust the radius of curvature of the curved reflective panel until illuminance values detected by the plurality of optical property detectors are equal.

10. The display device of claim 5, wherein the stereoscopic image analyzer compares a luminance value of each viewpoint among the plurality of viewpoints to an average luminance value of the plurality of viewpoints using a leave-one-out method to extract a correction coefficient for each viewpoint of the plurality of viewpoints, wherein the correction coefficient reduces a difference value between the luminance value for each viewpoint of the plurality of viewpoints and the average luminance value of the plurality of viewpoints using the leave-one-out method.

11. A test system comprising:

a stereoscopic display device that displays a test image, the stereoscopic display device comprising a display panel and an optical member on the display panel; and a test apparatus that detects a reflection of the test image reflected off a curved reflective panel, generates a correction coefficient for a plurality of viewpoints according to an optical property of the reflection of the test image for each of the viewpoints of the plurality of viewpoints, and provides the correction coefficient to the stereoscopic display device, wherein the test apparatus modulates a curvature of the curved reflective panel according to at least one of the optical property of the reflection of the test image or a distance between the display panel and the curved reflective panel, and analyzes the optical property of the reflection of the test image with a modulated curvature to generate the correction coefficient for each of the viewpoints of the plurality of viewpoints based on a result of the analysis.

12. The test system of claim 11, wherein the test apparatus comprises:

a plurality of optical property detectors arranged at a predetermined spacing on an inner reflection surface of the curved reflective panel facing the display panel and detecting optical property values of the reflection of the test image;

a distance information detector detecting distance information between the display panel and the curved reflective panel and a radius of curvature of the curved reflective panel;

a reflection curvature converter modulating the radius of curvature of the curved reflective panel;

a reflection curvature controller controlling the reflection curvature converter according to at least one of the optical property of the reflection of the test image or the radius of curvature of the curved reflective panel;

an image detector acquiring test image data by capturing the reflection of the test image; and a stereoscopic image analyzer analyzing an amount of crosstalk for each of the viewpoints of the plurality of viewpoints by analyzing at least one of a grayscale value or luminance value of the test image data.

13. The test system of claim 12, wherein the plurality of optical property detectors are arranged in a fan shape at a predetermined spacing on an inner reflection surface of the curved reflective panel maintaining the radius of curvature, such that the plurality of optical property detectors detect an illuminance value of the reflection of the test image.

14. The test system of claim 12, wherein the distance information detector measures a distance between the display panel and the inner reflection surface of the curved reflective panel, distances between the display panel and side portions of the curved reflective panel, and distances at angles of fan shapes using at least one of a plurality of ultrasonic sensors or a plurality of infrared sensors.

15. The test system of claim 12, wherein the distance information detector detects curvature information and curvature radius information of the curved reflective panel by measuring a distance between the display panel and the inner reflection surface of the curved reflective panel according to at least one of a predetermined rotation radius or rotation angle.

16. The test system of claim 12, wherein the reflection curvature controller generates control signals to control the reflection curvature converter to adjust the radius of curvature of the curved reflective panel to equalize illuminance values detected by the plurality of optical property detectors.

17. The test system of claim 15, wherein the reflection curvature converter comprises:

a first pressing rod and a second pressing rod that support and press side portions of the curved reflective panel;

a first moving member and a second moving member that support and move the first pressing rod and the second pressing rod, respectively;

at least one moving rail that defines a moving path of the first moving member and the second moving member; and a first driving motor and a second driving motor that move the first moving member and the second moving member along the at least one moving rail in response to control signals generated by the reflection curvature controller.

18. The test system of claim 12, wherein the reflection curvature controller generates control signals to control the reflection curvature converter to adjust the curvature radius of the curved reflective panel.

19. The test system of claim 12, wherein the stereoscopic image analyzer compares a luminance value of each of the viewpoints relative to an average luminance value for the plurality of viewpoints using a leave-one-out method to extract the correction coefficient for each of the viewpoints of the plurality of viewpoints to reduce a difference value between the luminance value for each of the viewpoints of the plurality of viewpoints and the average luminance value of the plurality of the viewpoints using the leave-one-out method.

20. The test system of claim 19, wherein the correction coefficient for each of the viewpoints of the plurality of viewpoints is set in inverse proportion to a respective one of the difference values.

* * * * *